US006850426B2

(12) United States Patent
Kojori et al.

(10) Patent No.: US 6,850,426 B2
(45) Date of Patent: Feb. 1, 2005

(54) SYNCHRONOUS AND BI-DIRECTIONAL VARIABLE FREQUENCY POWER CONVERSION SYSTEMS

(75) Inventors: Hassan A. Kojori, Mississauga (CA); Jack Daming Ma, Mississauga (CA); Zheng Wang, Mississauga (CA); George You Zhou, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 22 days.

(21) Appl. No.: 10/404,513

(22) Filed: Apr. 1, 2003

(65) Prior Publication Data

US 2003/0218887 A1 Nov. 27, 2003

Related U.S. Application Data

(60) Provisional application No. 60/376,572, filed on Apr. 30, 2002.

(51) Int. Cl.$^7$ .............................................. H02M 7/00
(52) U.S. Cl. .......................................... 363/123; 700/44
(58) Field of Search ....................... 363/123, 37; 700/44

(56) References Cited

U.S. PATENT DOCUMENTS

| 4,728,806 A | 3/1988 | Baker et al. |
|---|---|---|
| 5,008,801 A | 4/1991 | Glennon |
| 5,281,905 A | 1/1994 | Dhyanchand et al. |

(List continued on next page.)

FOREIGN PATENT DOCUMENTS

| EP | 0 352 340 A1 | 1/1990 |
|---|---|---|
| EP | 0 455 181 A | 11/1991 |
| EP | 1 039 389 A1 | 9/2000 |

OTHER PUBLICATIONS

El–Tamaly et al., "Low Cost PWM Converter for Utility Interface of Variable Speed Wind Turbine Generators," Applied Power Electronics Conference and Exposition, 1999, APEC '99, Fourteenth Annual, Dallas, TX, Mar. 14–18, 1999, Piscataway, NJ, IEEE, Mar. 14, 1999, pp. 889–895.

P. Eichenberger et al., "Predictive Vector Control of the Stator Voltages for an Induction Machine Drive with Current Source Inverter," Power Electronics Specialists Conference, 1997. PESC '97 Record., 28$^{th}$ Annual IEEE, St. Louis, MO Jun. 22–27, 1997, New YOrk, NY, IEEE, Jun. 22, 1997, pp. 1295–1301.

U. Radel et al., "Network Feeder with Synchronous Generator for Variable Speed Wind Turbines as a Laboratory Model, " EPE '97, 7$^{th}$ European Conference on Power Electronics and Applications, Trondheim, Sep. 8–10, 1997, EPE. European Conference on Power Electronics and Applications, Brussels, EPE Association, B, vol. 2, Conf. 7, Sep. 8, 1997, pp. 2735–2738.

(List continued on next page.)

*Primary Examiner*—Shawn Riley
(74) *Attorney, Agent, or Firm*—Larry J. Palguta

(57) ABSTRACT

A synchronous bi-directional active power conditioning system (11) suitable for wide variable frequency systems or active loads such as adjustable speed drives which require variable voltage variable frequency power management systems is disclosed. Common power electronics building blocks (100, 200) (both hardware and software modular blocks) are presented which can be used for AC-DC, DC-AC individually or cascaded together for AC-DC-AC power conversion suitable for variable voltage and/or wide variable frequency power management systems. A common control software building block (2, 5) includes a digital control strategy/algorithm and digital phase lock loop method and apparatus which are developed and implemented in a digital environment to provide gating patterns for the switching elements (3, 6) of the common power-pass modular power electronics building blocks (100, 200).

30 Claims, 24 Drawing Sheets

U.S. PATENT DOCUMENTS

| | | | |
|---|---|---|---|
| 5,317,498 A | | 5/1994 | Dhyandchand et al. |
| 5,521,787 A | | 5/1996 | Baker et al. |
| 5,627,744 A | | 5/1997 | Baker et al. |
| 5,764,502 A | | 6/1998 | Morgan et al. |
| 5,814,903 A | | 9/1998 | Wu |
| 5,912,552 A | | 6/1999 | Tateishi |
| 5,939,800 A | | 8/1999 | Artinian et al. |
| 5,959,852 A | | 9/1999 | Deloy et al. |
| 5,977,645 A | | 11/1999 | Glennon |
| 6,005,362 A | | 12/1999 | Enjeti et al. |
| 6,023,134 A | | 2/2000 | Carl et al. |
| 6,031,738 A | * | 2/2000 | Lipo et al. ............ 363/37 |
| 6,038,152 A | | 3/2000 | Baker |
| 6,108,221 A | | 8/2000 | Takada et al. |
| 6,122,575 A | | 9/2000 | Schmidt et al. |
| 6,124,646 A | | 9/2000 | Artinian et al. |
| 6,134,127 A | | 10/2000 | Kirchberg |
| 6,157,168 A | | 12/2000 | Malik |
| 6,175,163 B1 | | 1/2001 | Rinaldi et al. |
| 6,201,715 B1 | | 3/2001 | Huggett et al. |
| 6,243,277 B1 | | 6/2001 | Sun et al. |
| 6,297,980 B1 | | 10/2001 | Smedley et al. |
| 6,326,758 B1 | | 12/2001 | Discenzo |
| 6,330,668 B1 | | 12/2001 | Curiger et al. |
| 6,341,073 B1 | | 1/2002 | Lee |
| 6,366,483 B1 | | 4/2002 | Ma et al. |
| 6,370,050 B1 | | 4/2002 | Peng et al. |
| 6,566,764 B2 | * | 5/2003 | Rebsdorf et al. ............ 290/44 |
| 2002/0118001 A1 | | 8/2002 | Duffy et al. |

OTHER PUBLICATIONS

G. You et al., "Comparison of Pulse Width Modulation (PWM) Techniques for Advanced Aerospace Load Power Management Applications," Honeywell 2002–01–3183.

* cited by examiner

SYNCHRONOUS AND BI-DIRECTIONAL VARIABLE FREQUENCY POWER CONVERSION SYSTEMS

RELATED APPLICATION

This application claims priority under 35 U.S.C. §119(e) of U.S. Provisional Application 60/376,572 filed on Apr. 30, 2002, the entire contents of which are herein incorporated by reference.

FIELD OF THE INVENTION

The present invention relates to electrical power conversion and more particularly to synchronous and bi-directional variable frequency (VF) power conversion systems.

A new control structure/algorithm and digital phase lock loop are presented herein. The present invention provides bi-directional control of power flow, for either active rectification (AC-DC) or power inversion (DC-AC) or AC-AC power conversion by cascading two such units, with excellent steady-state and dynamic performance. The resulting power conditioning equipment is scalable, reconfigurable and efficient and can be easily integrated with substantially reduced cost, weight and size as a result of introducing standardized power electronics building blocks and control structure/algorithms. Key distinct features include:

- Power conversion equipment for conditioning power for VF electrical power generation/utilization with wide frequency of 320–800 Hz;
- Bi-directional synchronous active rectifier/inverter for AC-DC, DC-AC or AC-DC-AC for digital power conversion and/or load management;
- DC voltage boost and regulation to provide higher DC bus voltages traditionally achieved by single or multiple passive rectification units;
- Power factor correction achieved at the source and/or load AC side (input or output); and
- Active filtering which reduces the size of passive front end and back end filters and reduces the size of the DC link bus.

BACKGROUND OF THE INVENTION

Electrical power is traditionally generated with fixed frequency (FF) and applied to many different types of linear and nonlinear loads in the aerospace industry and other industries. Adjustable speed drives provide energy conservation and higher efficiencies at light load conditions at the expense of requiring power conditioning equipment to provide a variable voltage—variable frequency (VVVF) conditioned power for the speed control of the drive system. While utilities and general industry use a 50/60 Hz electrical system for the distribution of electric power, the aerospace industry has been using a 400 Hz system for its military and commercial applications. Recently, these traditional fixed frequency (FF, i.e., 400-Hz) generators are being gradually replaced by variable frequency (VF) generators, which deliver power at frequencies between 320 and 800 Hz. The reasons for transition to variable frequency include efficiency, weight, and economics. To maintain constant frequency, a constant speed of the alternator must be maintained. This is not an easy task when the generator is on the shaft of an aircraft's engine. In order to maintain a constant frequency, additional subsystems are required which are heavy and expensive and reduce the overall efficiency of the power system. Alternatively, a variable frequency power source for aerospace can be used. However, this approach poses a fundamental problem because certain types of loads are sensitive to variations in the supply frequency.

Many types of loads, whether active or passive, are sensitive to variations in the supply frequency and voltage magnitude. One example of such a load is an aerospace pump/fan application. In a variable frequency (VF) power system for aerospace, the frequency variation may have a ration of 2:1 or more. Since power for a typical fan/pump load is proportional to the cube of frequency, in this VF power system, the load is subjected to a power demand that is eight times its rating and is consequently damaged. Additionally, when the voltage magnitude of the source decreases, the load tries to draw more current if a constant power is maintained. This results in overheating of the load and can cause eventual damage. Therefore, to alleviate the negative impact of variable voltage variable frequency sources of power on these sensitive loads, advanced power conversion equipment capable of taking variable voltage and variable frequency AC power or unregulated DC power at the input are required to provide synchronous fixed or variable frequency conditioned power as required for numerous high performance "more electric loads" for aerospace and other industrial applications.

Many different power conversion solutions have been presented in the technical literature to alleviate the problems associated with the frequency sensitivity of certain loads to VF power by first converting the VF input power to an intermediate DC power, and then using inverters to condition the DC power to the desired fixed or variable frequency as required by the load in on-off control mode or adjustable speed/frequency systems. Examples of these systems include:

- Six pulse passive rectification along with passive filters;
- 12, 18, and 24 pulse rectification using 2, 3, or 4 passive three-phase rectifiers along with multi-phase auto-transformers and additional filters for harmonic cancellation;
- Single channel active rectification; and
- Multiple channel active rectification.

In variable frequency systems, most prior art solutions use simple three-phase passive diode rectification for AC-DC power conversion to avoid the complex implementation of traditional active rectifiers. The use of active rectification for aerospace and other industrial applications has been hindered by the complexity of the design, inherent failure modes, and excessive cost of these systems. Recently, active rectifier solutions have been suggested for aerospace applications. In particular, the technique disclosed in U.S. Pat. No. 6,038,152 developed by D. E. Baker suffers from the following problems:

- The control method does not provide a regulated DC bus voltage;
- The control method can not be used to provide a higher value than the normal three phase diode rectification level;
- The proposed method uses a fixed four pulse gating pattern, which cannot provide the benefits of a closed-loop gating pattern control with high dynamic performance and ability to control the fundamental component of the AC system voltage in real time due to a very low switching frequency. Therefore this method is not suitable for high dynamic performance DC-AC loads such as adjustable speed drives;
- Implementation of memory-based gating patterns are based on feed-forward pre-calculated switching patterns and would not allow for real time error correction in case of deviation from the assumed system model; and Furthermore, this reference suggests that implementation of an active rectifier with a 10 kHz switching frequency to meet power quality requirements of aerospace for VF systems is impractical due to excessive power losses and can not be achieved.

Prior art active rectification for different types of AC-DC converters to meet power quality and proposes a digital active rectifier for fixed frequency AC power system applications suffers from certain drawbacks. More particularly, the control structure/algorithm is complex, tuning of the controller parameters is not straightforward and the implementation is not cost effective as it requires high digital signal processing throughput. Furthermore, large filter components and excessive thermal management is required due to a very high switching frequency of 20 kHz for the controlled devices, which significantly increases the cost and weight of the overall system.

Lack of a robust control method and proper synchronization suitable for the wide frequency variation range of 320–800 Hz for aerospace variable frequency systems has hindered the acceptance of prior art active rectifiers/inverters as a viable solution for aerospace high power conversion/utilization applications. These traditional power conversion systems suffer from poor reliability, excessive cost and weight and lower power density. Prior art power conversion equipment is not easily scalable, flexible or configurable to support modular building blocks for cost-effective next generation power conversion equipment with much improved power density, reliability and minimal thermal management requirements. Finally, the packaging, manufacturing and maintenance of most of the existing power conversion equipment is tedious, time consuming and expensive.

Optimized implementation of a control structure/algorithm requires an accurate and easy to implement Phase Lock Loop (PLL) to measure the variable frequency of the system for successful synchronization of the power conditioning equipment to the source (AC-DC) or load (DC-AC) or to both (AC-DC-AC). Once the system frequency is measured, as is well known in the technical literature, real-time rotating reference frame angles are calculated which are then used for standard rotating vector (abc-to-alpha/beta) and stationary time-invariant reference frame (alpha/beta-to-d/q) transformations and vice-versa (i.e., transformation back to abc from d-q stationary reference frame). These transformations are needed for generation of gating patterns for the controlled devices of the power conditioning system (i.e., AC-DC active rectifier or DC-AC inverter) and proper regulation and closed-loop control of system variables such as DC bus voltage and power factor correction.

In power electronics based systems, the output of the PLL is a clock signal, which provides real-time adjustment of the sampling frequency for the A/D conversion system as the frequency (f) of the AC-side is changing. In addition, real time phase angle information is required for rotating vector to stationary reference frame and vice versa transformations. In most PLLs the real-time phase delay angles are obtained by integration of the angular frequency ($2\Pi f$) with respect to time.

Many different types of analog and digital PLL systems have been proposed and used for power electronic systems. Analog PLLs have been well modeled and developed by linear control theory, starting from a well-defined model in the continuous-time-domain. However, power electronics systems are sampled data systems and are non-linear. Linear-control theory and modeling can be only used for very high sampling rates. A high switching frequency requires high digital signal processing throughput, is expensive to implement and results in poor efficiency due to excessive switching frequency losses. This demands bulky and expensive thermal management systems. For practical reasons a very high switching frequency is not affordable due to these problems and the fact that present high power semiconductor devices such as IGBTs, mainly used for power conditioning systems, are limited to switching frequencies well below 20 kHz. The development and implementation of nonlinear Digital Phase Lock Loop (DPLL) systems have been hindered for power electronic systems due to the complexity of nonlinear and discrete control theory.

Prior art PLLs are not suitable for a wide variable frequency power system due to the following reasons:

Limited frequency tracking capability;

Difficulty in designing the loop filter and tuning the parameters of the required controllers (in most cases, a proportional-integral, i.e., a PI controller); and Stability analysis and implementation is not straightforward due to the measurement time-delays and the fact that the nonlinear system is only modeled as a second order system.

Additionally, the prior art implementation of analog PLLs is subject to op-amp offsets, drift and parameter variations. The digital PLLs require high sampling rate, require a lot of on-line calculations and are difficult to implement.

There are many components, devices, equipment and systems required to make up an electrical power conversion system for motor controls applications. A stand-alone motor controller includes an inverter with all the associated controls, protection circuitry, thermal management, input and output connectors and is properly packaged in a chassis. The cost, weight, size, efficiency and reliability of a motor controller is a complex function of power rating, duty cycle, cooling medium, environmental requirements and is also significantly impacted by how these main subassemblies/functions are realized and partitioned with respect to each other and integrated together in a package for ease of manufacturing and maintenance.

Conventional power electronics based motor controllers include the following main subassemblies/functions:

Logic power supply;

Power electronics controller;

Control strategy/algorithm;

Power pass inverter (and rectifier if AC-DC-AC) devices/module;

Signal measurement (current, voltage temp, speed, etc.) and isolation;

Gate driver;

Power interconnect;

Logic interconnect;

Power sequencing, protection coordination and fault tolerance circuitry;

EMI and power quality filters for input and output;

Thermal management;

DC link capacitor;

Type and size of motor drive (DC Machine, Induction Machine, PMSM, wound field SM, SRM etc.);

Controls I/O; and

Chassis.

The following requirements/considerations would also have a major impact on the design and manufacture of the motor controller:

Method of speed control (hall effect/resolver or sensorless method);

Level of integration with the electromechanical system (motor/generator);

Centralized versus distributed control circuitry; and

Environmental requirements.

The conventional aerospace motor controller practice is very refined. However, these power conversion technologies can not be effectively used for future commercial transport applications because they suffer from:

Excessive weight yielding a very low power density;

High cost due to custom made parts and approach;

Low reliability due to excessive number of component count and lack of proper health monitoring and protection coordination;

Low efficiency due to excessive power losses in the power electronic devices and associated filters; and Large size due to excessive partitioned functional blocks and poor design partitioning/integration.

Some of the reasons why such "conventional" motor controls technologies can suffer from these problems include the following:

Separate "logic power supply" with many voltage levels utilized;

"Centralized Controls" concept is used with multiple control boards and logic/power interconnects for controlling the motor using mainly analog circuitry or non-optimized custom-made digital circuits with relatively low digital signal processing throughput Control structure/algorithm not optimized for bi-directional and wide variable frequency power systems;

Power pass inverter realized by discrete devices and are custom made and very expensive;

Bulky sensors and expensive methods used for signal measurement (current, voltage temp, speed, etc.) and high voltage signal isolation;

Gate driver circuit design is custom made for each application and does not have all the necessary protection and diagnostics functions to effectively handle failure modes at the device level;

Extensive use of bulky and expensive power interconnect (e.g., Bus Bars);

DC Bus of 270 VDC and AC voltage of 115V, 400 Hz. The main limitation being the fact that the DC bus is obtained by natural three phase diode rectification and can be significantly lower or higher and the AC system has to be 400 Hz fixed frequency;

Extensive use of expensive and fragile logic interconnect;

Limited BIT and lack of comprehensive power sequencing (such as soft-start/stop and ride-through) protection coordination, health monitoring and prognostics and fault tolerance circuitry results in poor functional performance and/or reliability;

Bulky and expensive EMI and power quality filters for input and output;

Bulky and expensive custom made thermal management;

Low energy density high voltage capacitors are custom made and used as bulk "DC link" capacitors. These are temperature dependent, expensive and difficult to package;

The developed motor controls are not flexible to accommodate different types and sizes of motor drives (Induction Machine, Permanent Magnet Synchronous Machine (PMSM), and wound field SM); and Large size chassis required due to low power density and excessive volume required to package the different subassemblies.

SUMMARY OF THE INVENTION

In accordance with the present invention, a new control structure/algorithm and digital phase lock loop for realizing bi-directional synchronous power conversion systems for variable frequency power sources and/or adjustable speed motor controls in the aerospace industry and other industries is provided. The above identified motor controls deficiencies are addressed and additional improvements and refinements to the prior art power conversion equipment for motor controls are presented which further facilitate ease of integration and reduce the cost and weight of the overall power conditioning systems for next generation aerospace and general industry applications.

Additionally, the present invention provides a digital phase lock loop and control strategy/algorithm for realizing bi-directional synchronous power conversion systems for variable frequency power sources and/or adjustable speed motor controls in the aerospace and general industry.

Accordingly, the invention provides a synchronous and bi-directional power conversion module for use in a variable frequency power conversion system, the power conversion module comprising a digital controller that receives signals from AC and DC voltage and current sensors and generates gating signals to power switching devices to control power flow between an AC side and a DC side of the power switching devices, wherein the digital controller includes a digital phase lock loop that uses a feed-forward predictive system based on a look-up table to track the system variable frequency.

Further, a method and apparatus for implementing a digital phase lock loop (DPLL) for variable frequency power conversion systems are provided. The method and apparatus include determining a reference phase angle error signal based on a reference phase angle of a three-phase voltage variable frequency input and an estimated phase angle. A measured frequency of the variable frequency input is determined based on the phase angle error signal. The measured frequency is used as an input to a look-up table that generates a phase angle step, a sampling frequency, and a phase angle delay, wherein the estimated phase angle is generated by a discrete integrator using the phase angle step and a prior value of the estimated phase angle, and a compensated phase angle is generated using the estimated phase angle and the phase angle delay.

Furthermore, additional improvements and refinements to the prior art power conversion equipment for motor controls are presented which further facilitate ease of integration and reduce the cost and weight of the overall power conditioning systems for next generation aerospace and other industry applications.

BRIEF DESCRIPTION OF THE DRAWINGS

A more complete understanding of the present invention and its advantages will become apparent from the following description taken in conjunction with the accompanying drawings, wherein.

DETAILED DESCRIPTION OF THE PREFERRED EMBODIMENTS

Figure 1A:
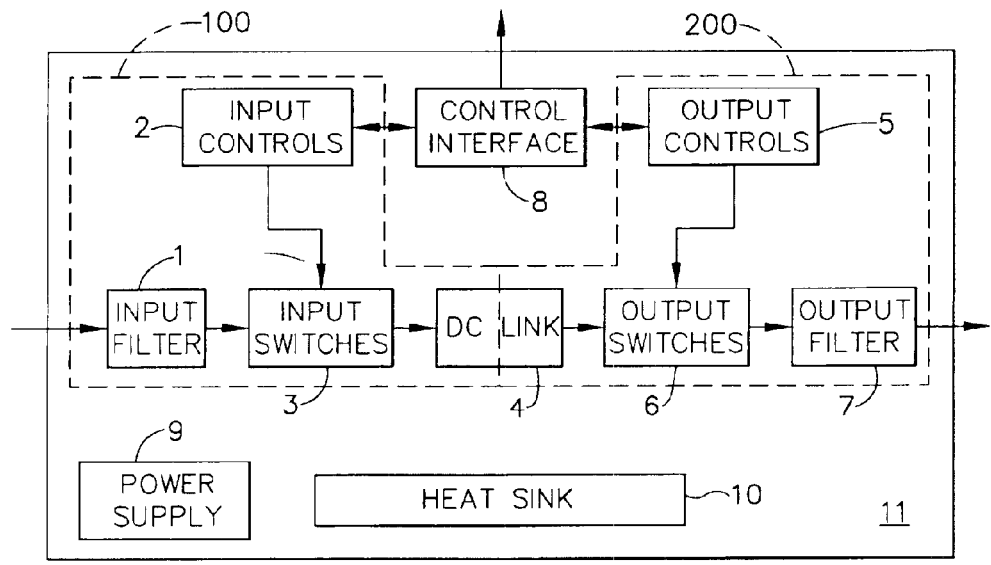
FIG. 1A illustrates a top-level block diagram of the modules of a synchronous and bi-directional variable frequency power conversion system for an AC-DC-AC application in accordance with the invention.

Aspects of the invention are disclosed in the accompanying description with reference to the appended Figures.

The preferred embodiments disclose aspects of a new control structure/algorithm and digital phase lock loop and power electronics design, sensing and isolation of high voltage and current signals, control architecture and control algorithm along with digital controls implementation, power sequencing, protection, diagnostics monitoring and operation of generalized power conversion equipment capable of taking input power from either a variable voltage variable frequency (VVVF) AC power or a DC power supply at the input and provide controlled fixed frequency or VVVF power at the output as required to run any type of linear/nonlinear, passive or active loads. In particular, the disclosed common power conversion equipment module (for AC-DC, DC-AC or AC-DC-AC) provides scalable, flexible and configurable modular building blocks for cost-effective next generation (NG) power conversion equipment with highest power density, highest reliability and that significantly improves the thermal management, packaging, ease of manufacturing and maintenance of the overall power conversion equipment.

These common power conversion equipment technologies are used in providing next generation (NG) integrated utilities/controls for many aerospace and ground applications such as:

Electric Power System (EPS) Variable Frequency Generation & Distribution Systems;

Next Generation Environmental Control Systems (ECS) (Bleed Electric/TurboGen and VCS systems);

Power Conversion Equipment and/or Motor (Induction, Synchronous or BLDG or Switched Reluctance Motor) Controllers for Hydraulic, Pneumatic and utility systems in Support of "More Electric Aircraft" (MEA) and "Power By Wire" Initiatives;

NG Digital Power Conversion/ Digital Load Management and Utilization;

NG Cooling Galley Motor Control;

NG APU Start And No-Bleed Main Engine Start;

Magnetic Bearing Controls;

Active Filters;

Electric Thrust Reversers; and

Electric Car Propulsion (Land, Sea and Air).

This invention provides high power density, reliable and cost-effective power conversion equipment for the target aerospace and industrial applications and is comprised of a synchronous AC-DC and/or DC-AC power conversion with near sinusoidal input and/or output waveforms with the lightest weight filter components to supply and control bi-directional power flow to/from an active or passive load. The invention is suitable for Aerospace Variable Frequency Power Systems (wide frequency of 320–800 Hz). Embodiments include an advanced variable voltage variable frequency (VVVF) synchronous Active-Front-End Rectifier which provides: DC-link voltage boost above natural voltage rectification achieved from the AC source; digital power conversion, digital load management; active filtering and/or damping; real-time power factor (PF) correction; and power quality compliant for aerospace (e.g., voltage & current total harmonic distortions (THD) below a certain limit which is typically 5 to 8%).

Additional embodiments include an advanced inverter that provides VVVF or fixed frequency/voltage output to supply power to any type of load including active motor loads such as induction motor, synchronous machine or Brushless DC (BLDG) motor or other passive loads. System integration features integrate all the functions of power supply, gate drivers, sensing, signal isolation and conditioning in one circuit card assembly, ride-through ability to survive "AC system sags" and/or momentary power interruptions, and an efficient soft-start method that provides transient free current/voltage from the power conversion system at the input and output.

In the face of a momentary power interruption, the ride-through capability allows the power conversion system to properly resume operation without any significant electrical transients or time-delay (a need for waiting for speed to ramp-down to zero), usually referred to as a "cold-start". In a traditional power conversion equipment/motor controller system, when there is a momentary power interruption, protective functions at best detect a problem with the power system and shut down the system. The motor/load cannot be re-energized immediately after the power is restored due to significant problems arising from the speed of the electromechanical load and synchronization problems which usually arise due to back emf of other types of active loads. In the case of motor controls, a cold-start is required which introduces time delays before speed can be restored to pre-fault conditions. In certain applications these time delays and nuisance trips cannot be tolerated.

FIG. 1A illustrates a top-level block diagram of the modules of a synchronous and bi-directional variable frequency AC-DC-AC power conversion system 11 in accordance with the invention, which allows the power conversion equipment to regenerate in a safe and controllable fashion. A front-end 100 includes input filter 1, input switches 3 (e.g., diodes, SCRs, IGBTs, MCT's, MOSFETs, IPMs and the like), and related input controls 2. The front-end 100 supplies the DC-link capacitors 4, which provide DC power to an output section 200. Output switches 6 (e.g., SCRs, IGBTs, MCT's, MOSFETs, IPMs and the like) are coupled to the DC-link 4 and draw/supply current from/to the DC-link 4 depending on the mode of operation as controlled by output controls 5. Output filters 7 condition the switched power that is passed to/from a load (e.g., motor). The power in a bi-directional system (i.e., regenerative) can flow both into and out of the load. Therefore, those skilled in the art will appreciate that the labels output and input are by convention and do not limit the functionality of the modules. The other modules in the system include power supply 9 that provides for power for the controls 2, 5, control interface 8, gate drivers, and the like. The control interface 8 is used to interface the input and output controls to higher-level control systems (e.g., a central control computer). Heat sink 10 provides for cooling of the electronic components, particularly the input switches 3 and the output switches 6 that generate significant heat due to the high power switching losses in the switching devices. Specific aspects of these modules will be addressed in the following description.

Figure 1B:
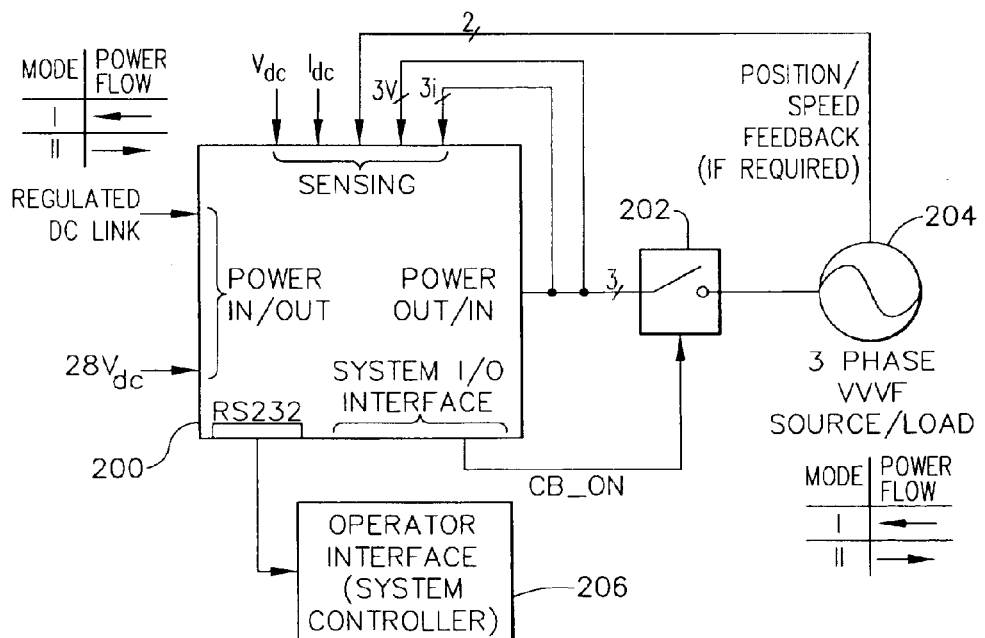
FIG. 1B is a block diagram of a common power conversion module and associated interconnected components according to an embodiment of the invention.

FIG. 1B is a block diagram of an output/inverter module 200 and associated interconnected components. Once again the term output is relative to the mode of operation and does not limit the operation of the output module 200. The module 200 is coupled to a DC-link 4 that operates at high voltage and high current. The DC-link 4 can either supply or receive power depending on the mode of operation. A 28 VDC input is also provided for generating control/logic power supply voltages. However, the control voltage can be any that is appropriate for the system specification, as the power supply generates the voltages for the internal requirements of module 200, which will be discussed in detail below. System feedback/sensing includes DC voltage and current signals from the DC-link, three-phase voltage and current of the load 204 (e.g., motor) and can include position/speed feedback from load 204 for closed loop operation or electronic commutation of the controlled devices. A power switch 202 (e.g., contactor, circuit breaker and the like) can be used to isolate the load 204. The power switch 202 is controlled from the output module 200. Finally, an operator interface/system controller 206 is operably connected (e.g., serial communication, parallel communication, discrete control lines, and the like) to the output module 200 for receiving/providing information from/to the output controller, such as motor speed, position command and the like.

In various modes of operation the system provides for AC-DC power conversion (Mode I), DC-AC power conversion (Mode II) and AC-DC-AC power conversion (Mode III). As illustrated in FIG. 1B, when the output module is operating in Mode II the DC-link is supplying power and the output module 200 is converting it to VVVF three-phase power and delivering it to load 204. Conversely, in Mode I (e.g., direct AC-DC power conversion or regenerative braking), the power flows from a three-phase VVVF power source/load to the DC link 4. The power switches of output module 200 convert the power from load 204 and supplies power to the DC-link. The DC-link receives current from output module 200, in Mode I.

Figure 1C:
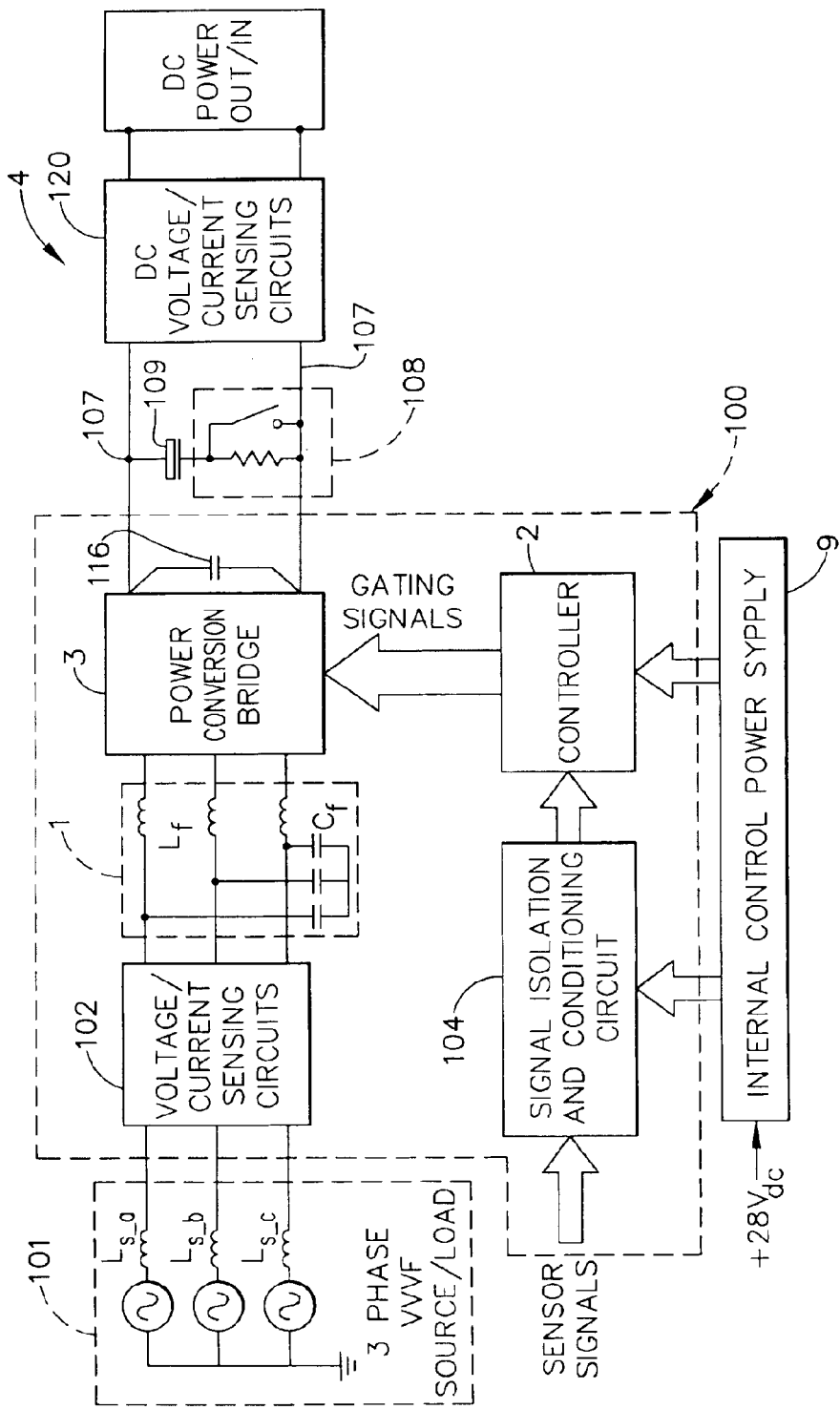
FIG. 1C illustrates a detailed view of the front-end/input common power conversion (for AC-DC or DC-AC) module and related components according to an embodiment of the invention.

FIG. 1C illustrates a detailed view of the front-end/input module 100 and related components. A three-phase VVVF source/load 101 supplies power to the front-end module in Mode I. Voltage and current sensing circuits 102 measure the voltage and current on the front-end input and generate corresponding output signals. These signals and signals from the DC voltage/current sensing circuits 120 are routed through a signal isolation and conditioning circuit 104 to isolate the controller 2 from the high voltages and to scale the signals as necessary for use by the controller 2. The controller 2 generates the appropriate gating signals to control the switching of power conversion bridge 3 to provide bi-directional power flow. DC-link 4 includes link capacitor 109 and soft-start circuit 108 connected between the DC bus 107. Those skilled in the art will appreciate that a front-end/input module 100 mirrors the operation of the output module 200. Specifically, in Mode I the front-end/input module 100 receives AC power from source 101, converts it to DC and supplies it to the DC-link 4. Likewise, in Mode II, the DC-link 4 supplies current to the front-end/input module 100 that converts it and supplies current back to the AC source 101. Although the modules can operate independently, when combined (e.g., FIG. 1A) Mode III operation can be achieved and power is converted from AC to DC and back to AC in both directions.

Figure 2:
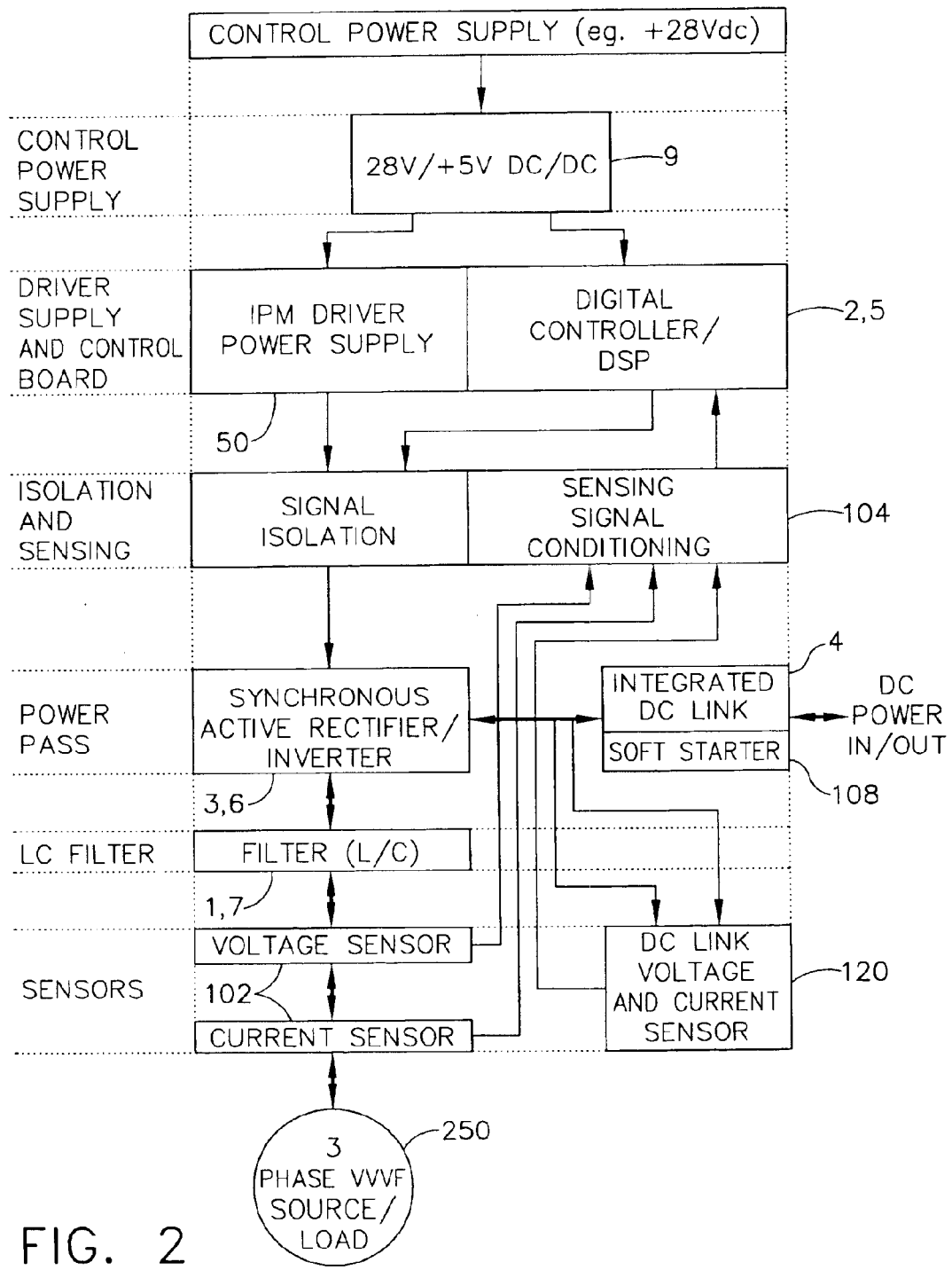
FIG. 2 is a detailed block diagram of an embodiment of the power conversion system illustrating the integration of the components according to an embodiment of the invention.

FIG. 2 illustrates a detailed system block diagram of an embodiment of the power conversion system. The power conversion system can be used on either the rectifier/input side or the inverter/output side. FIG. 2 also illustrates a structured layered approach to the configuration of a standardized power conversion system. Each layer represents aspects of the power conversion system that are addressed in a modular scheme to facilitate integration of the system hardware/software. Most of the elements in the layers have already been discussed with respect to the FIGS. 1A–C and therefore will not be further detailed herein. The control power supply 9 operates independently to provide the necessary control/logic supply voltage levels (e.g., 5V, 15V) as needed by the PCE. The control power supply 9 uses a single external voltage (e.g., 28V) and performs all conversion/scaling necessary to supply the appropriate control voltages to the power conversion system. The next layer illustrated is the drive supply and control board, which contains an intelligent power module (IPM) driver power supply 50 and a digital controller 2, 5 (e.g., DSP). The isolation and sensing layer contains signal isolation and conditioning circuits 104. The power pass layer includes the power switching circuits 3, 6 and an integrated DC-link 4 and soft start circuit 108. A filter layer includes the inductive and capacitive elements that form the input/output filter 1/7 to condition power to/from the AC load/source 250. The sensor layer includes integrated AC sensors 102 and DC-link sensors 120. The sensors provide feedback to the controller 2, 5 via the signal isolation and conditioning circuits 104. The feedback from the sensors allows reporting, data acquisition, and the controller to regulate the power flow bi-directionally by determining the appropriate gating/switching pattern for the power switching circuit 3, 6. Each module can operate in either Mode I or Mode II drawing/supplying power to/from the DC-link 4 and AC source 250. Additionally, two modules can be combined and controllers 2, 5 can be configured to operate in combination to provide a complete Mode III system. Since the controllers are digital and intelligent, the control software can be easily configured to operate as either a rectifier or an inverter regulator. Depending on the application, additional signals (e.g., speed/position feedback in a motor control) are used to determine the operation of the controller 2, 5 and gating of the power switching circuit 3, 6. However, these signals are easily integrated into the module via the isolation and conditioning circuit and control software.

Figure 3:
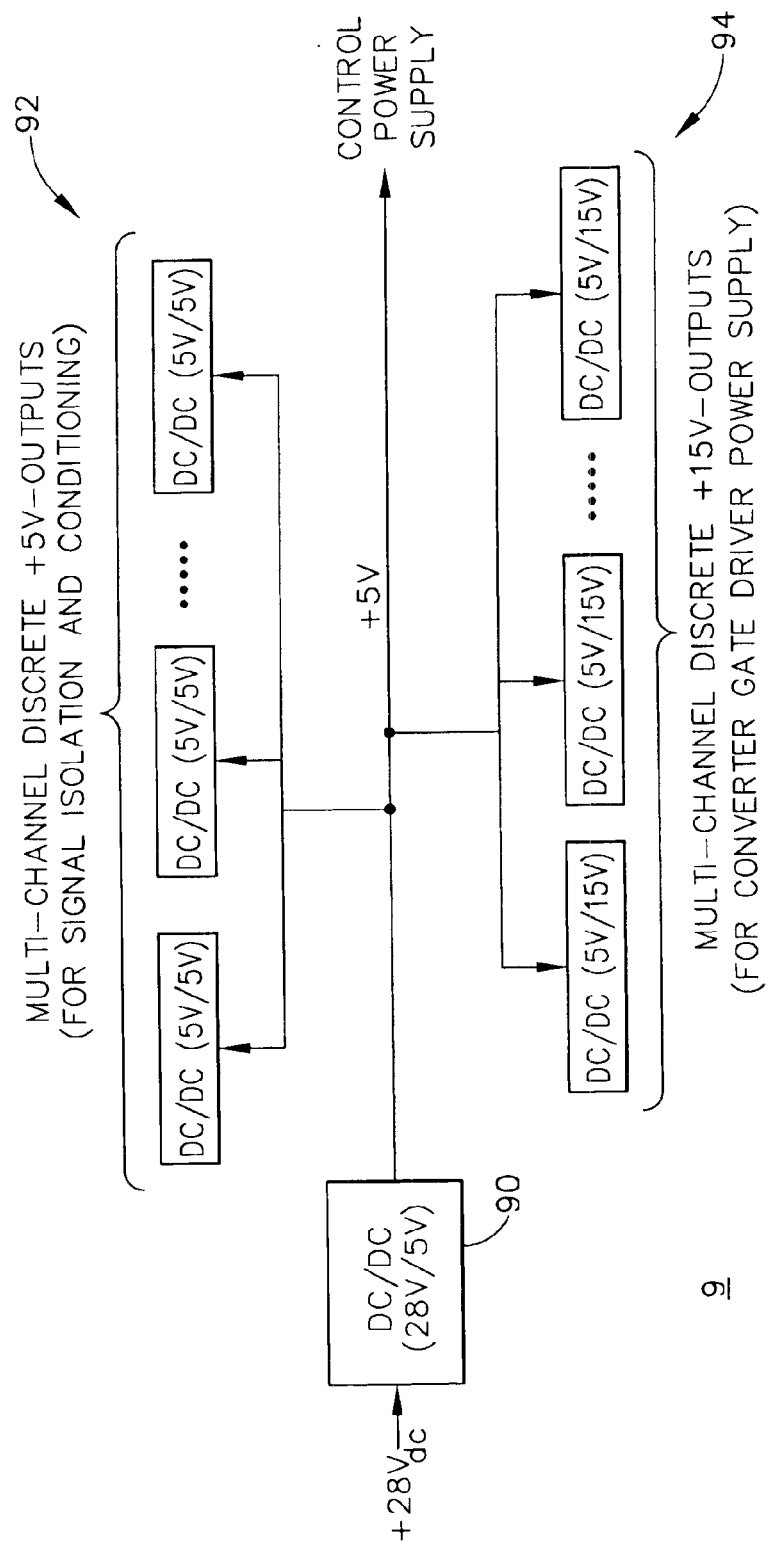
FIG. 3 is an illustration of the distributed logic power supply according to an embodiment of the invention.

FIG. 3 is a detailed illustration of the power supply 9. In the illustrated embodiment, a 28V supply is converted into 5V control power in DC/DC converter 90. The 5V control power supply is used to supply additional DC/DC converters 92 and 94 for isolating/converting to other supply voltages for each subsystem on the PCE module in a distributed fashion which is one of the key aspects of this control/logic power supply design. For example, 5V to 5V DC/DC converters 92 can be used to isolate and supply 5V power to the signal isolation and conditioning circuits. Additionally, 5V to 15V DC/DC converters 94 can be used to isolate and convert the common 5V supply to 15V and provide 15V power to the gate drivers at the point of use. The voltages and distribution schemes are provided for illustration only and the invention is not limited to the configuration shown. Those skilled in the art will appreciate that the described power supply provides an integrated and distributed power supply and as illustrated it uses only one external supply level and therefore does not require multiple supplies (e.g., 28V, 15V, 5V, and the like) from an external system. Therefore, there is no need for a separate external power supply and the low voltage power supply buses are eliminated and these bus connections are reduced to only one. Further, the integrated power supply allows for isolation, control and integration into the module of the power sources needed for the module. Thus, interchangeability of the modules and design flexibility are enhanced. For example, a module that uses an IPM can have different voltage requirements than a module that uses discrete IGBTs as switching devices. However, either module could be used without altering the supply voltage (e.g., 28V) since the necessary voltages are generated internally on the integrated power supply 9 in a distributed fashion at the point of use.

Figure 4:
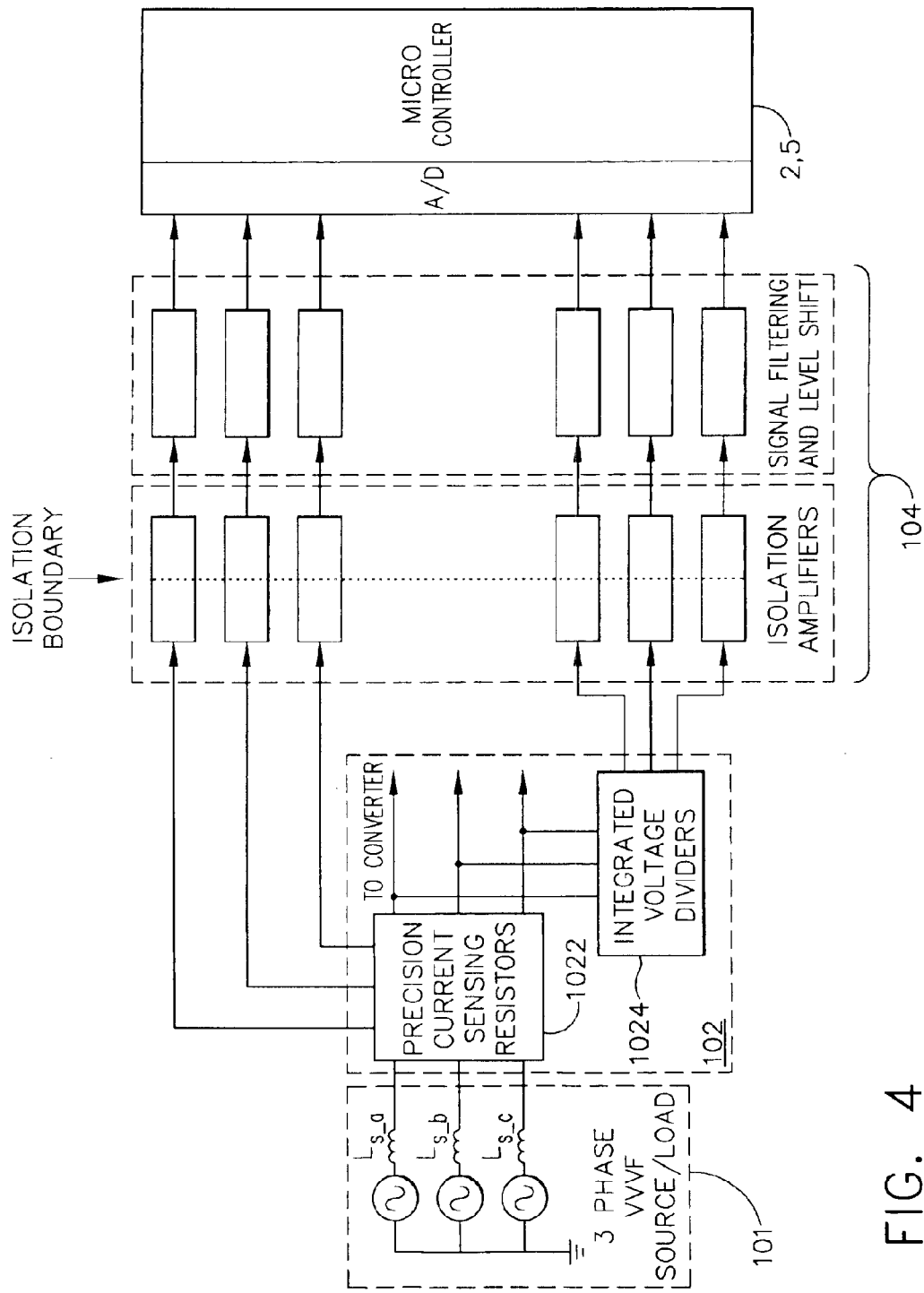
FIG. 4 illustrates the three phase current and voltage sensing circuit along with high voltage signal isolation circuitry according to an embodiment of the invention.

FIG. 4 illustrates a current and voltage sensing circuit according to an embodiment of the invention. Precision shunt resistors 1022 detect the current of the VVVF source/load 101 by using the voltage generated across the resistors. This voltage is provided to isolation and signal conditioning circuit 104, which isolates, filters and scales the signal. Other types of current sensing can be used that are well known in the art. The isolated and scaled source/load 101 current signals from the isolation and signal conditioning circuit 104 is provided to integrated A/D converters of controller 2, 5 that converts the signals into a digital format that is usable by the digital controller 2, 5. Likewise, the integrated voltage dividers 1024 provide voltages proportional to the voltages of the VVVF source/load 101. The voltage signals from the dividers 1024 are isolated and filtered/scaled in signal conditioning circuit 104. The isolated and scaled source/load 101 voltage signals from the isolation and signal conditioning circuit 104 is provided to integrated A/D converters of controller 2, 5 that converts the signals into a digital format that is usable by the digital controller 2, 5. The controller 2, 5 can then derive additional information (e.g., phase, power factor (PF), and the like) from the voltage and current signals without any additional sensors or components.

One of the main aspects of this design which significantly reduces cost, weight and improves reliability is the fact that many complex hardware functions/components are integrated into one circuit card assembly 84 (FIG. 8) which includes:

All the sensing for three phase AC current and AC voltage;
All the sensing for DC link current and voltage;
Signal conditioning and isolation circuitry for all the sensed signals;
Signal isolation for all the gate driver circuitry for providing on/off control to the intelligent power modules (IPMs), and routing all the protective/status signals for monitoring the health of IPM;
Distributed DC Link snubber capacitors right close to the DC link terminals of the IPM module;
Integrated and distributed control/logic power supply;
Soft start circuitry and associated controls;
All logic /control interconnect; and
All power pass bus-bars.

Figure 5A:
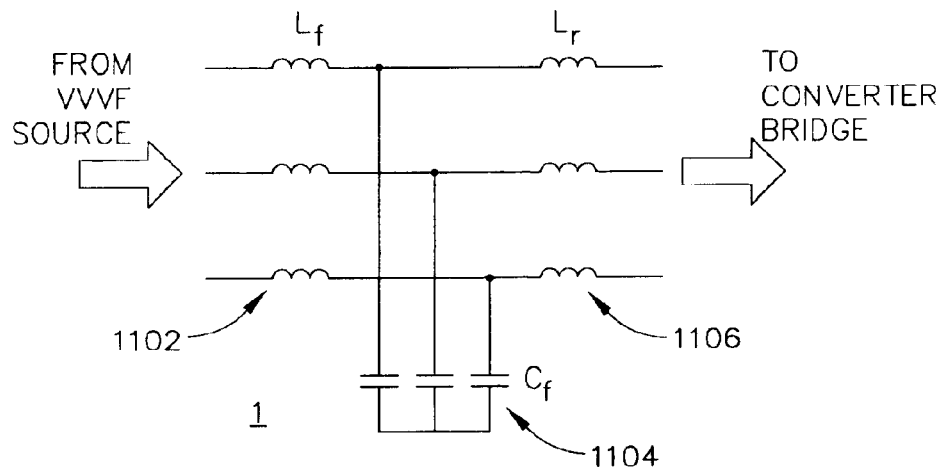
FIGS. 5A and 5B illustrate input and output filter configurations according to an embodiment of the invention.

FIG. 5A illustrates a common building block filter configuration in the general sense which can be used for either the input or output filter of AC-DC or DC-AC power conversion equipment according to an embodiment of the invention. When used for the front end power conversion filtering, this input filter configuration having a first set of three inductors 1102 each connected on one lead with one phase of the VVVF source and the other lead is connected to a set of Y-connected capacitors 1104 and a second set of inductors 1106. The second set of three inductors, which act as boost inductors, is connected on the other lead to the input side of the AC-DC active rectifier and supplies the three-phase VVVF power to the converter bridge. Each of the capacitors 1104 is connected to one phase of the power and the other leads of capacitors 1104 are connect in common. In the reverse power flow mode, this filter configuration provides output filtering to the out of the inverter and provides near sinusoidal waveforms to a load. Variation to this generalized filter configuration is possible depending on the application and the required components of the input/output filters can be selected and rated based on the power quality and EMI requirements and restrictions:

Total harmonic distortion (usually between 5 to 8%);

Maximum allowable magnitude of an individual harmonic; and

Conducted and radiated emissions, the components of these filters are requirements.

According to one embodiment of the present invention, the new optimum control structure/algorithm and digital phase lock loop, which will be explained later, operate at a much lower switching frequency of 10 kHz (for aerospace VF applications) and provide fast dynamic response and stable/predictable resonant-free performance under all modes of operation. This allows the designer to set the crossover frequency of this filter at a much higher value as compared to traditional filters with the same configuration for similar applications. This aspect of the present invention provides for common power conversion equipment for bi-directional and synchronous and wide variable frequency operation with minimum filtering requirements and reduced thermal management and consequently significantly reduces the cost, weight and size of the overall power conditioning equipment.

Figure 5B:
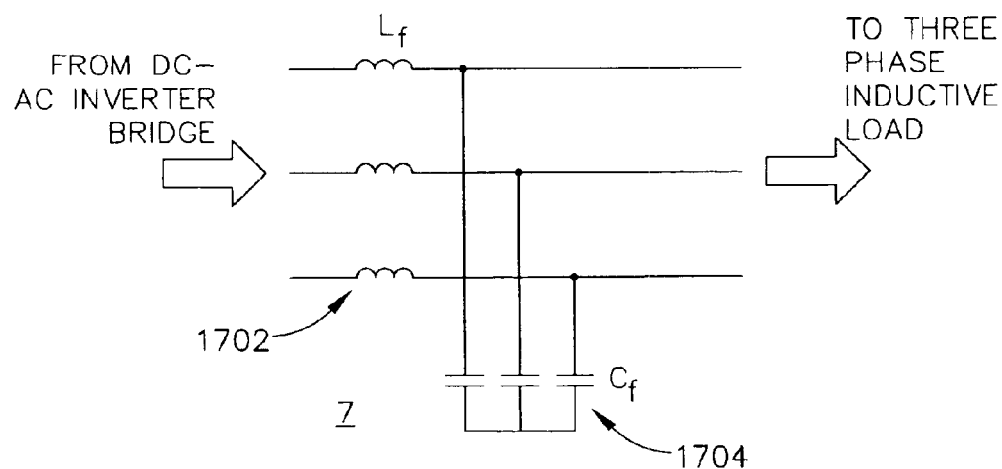

FIG. 5B illustrates a filter configuration having a first set of three inductors 1702 each connected on one lead with one phase of the inverter bridge/power switching devices and the other lead is connected to a set of capacitors 1704 and to the load. Each of the capacitors 1704 is connected to one phase of the power and the other leads of capacitors 1704 are connect in common. Those skilled in the art will appreciate that the FIG. 5B reflects the same general "T" filter configuration with the second set of inductors bypassed. Accordingly, filters 1 and 7 can be designed as discussed above to help to reduce the harmonic distortion in the system on both the input and output side of the power conversion system.

Figure 6:
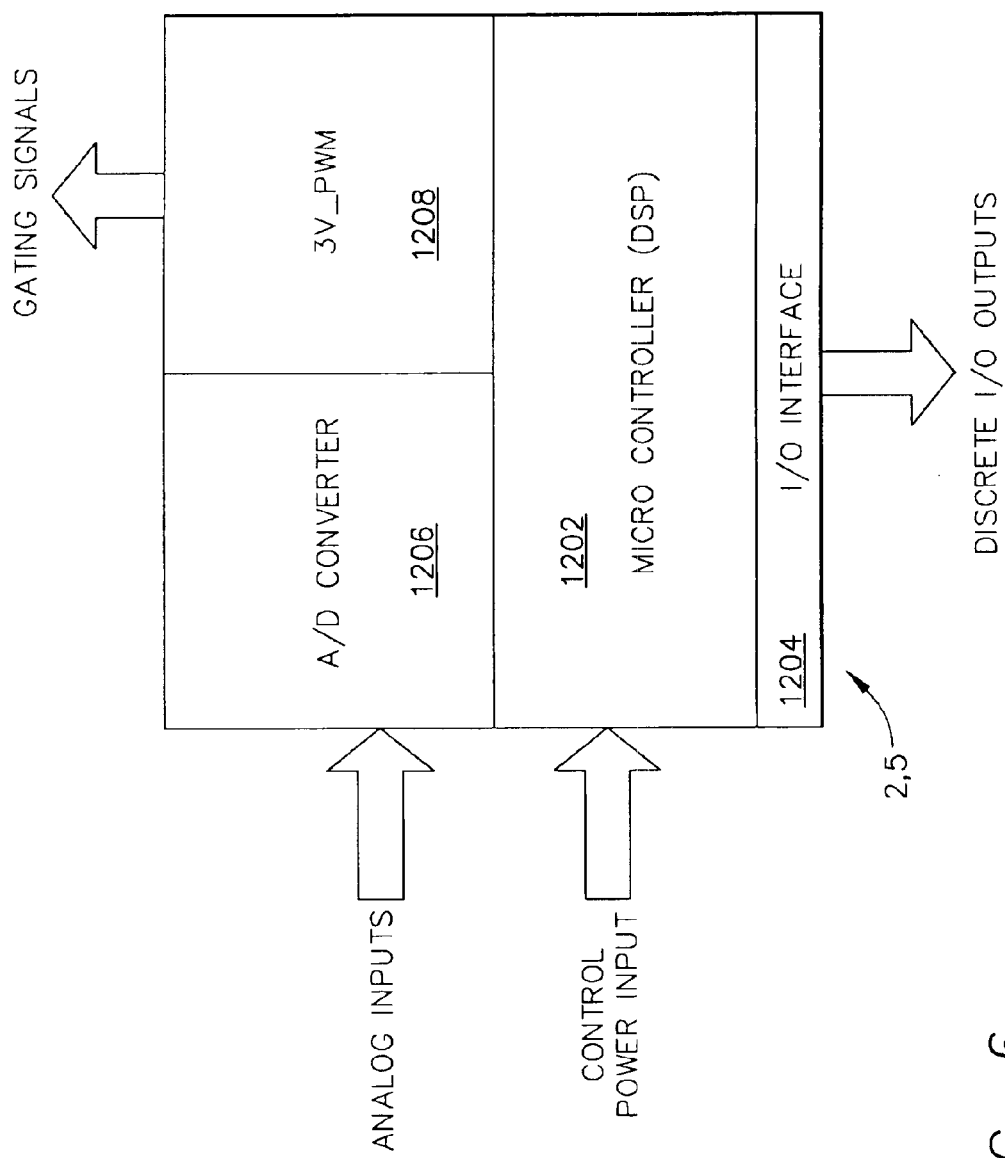
FIG. 6 is a block diagram of a digital controller according to an embodiment of the invention.

FIG. 6 is a block diagram of a common building block digital controller according to an embodiment of the invention. In the configuration illustrated, controller 2, 5 includes a processor 1202 (e.g., microcontroller, DSP, and the like). An A/D converter 1206 receives and converts external analog inputs, which are then provided in a digital format to processor 1202. I/O interface 1204 allows the digital signal processor 1202 to interface to discrete I/O from the external system and the other components on the module. Space Vector Pulse Width Modulation ($SV_{13}$ PWM) for either the front AC-DC power conversion or back-end DC-AC inversion which is well known in the art. For example, Space Vector Pulse Width Modulation is described in a paper by Zhou, G. Y., Kojori, H., and Wu, B. "Comparison of Pulse Width Modulation (PWM) Techniques for Advanced Aerospace Load Power Management Applications", Honeywell 2002-01-3183, which is incorporated by reference herein in its entirety. Accordingly, a detailed description of SV_PWM is not provided herein.

SV_PWM is used to generate gate control signals from the digital signal processor 1202 to gating signals at common logic power supply voltage and is later conditioned and isolated on the power interface board 84 before it is applied to the IPM to provide proper gating signals at the right voltage and current levels to drive the gates of the individual power switching devices. For ease of implementation, custom DSPs particularly designed for motor controllers are used with the main advantage that all the functions shown in FIG. 6 are embedded in the DSP. The controller architecture illustrated in FIG. 6 can operate both as the input controller 2 or output controller 3. Since processor 1202 can easily be reconfigured by software and all the signal conversion/interface devices are integrated into the controller, the controller can easily be adapted to implement the desired function.

Figure 7:
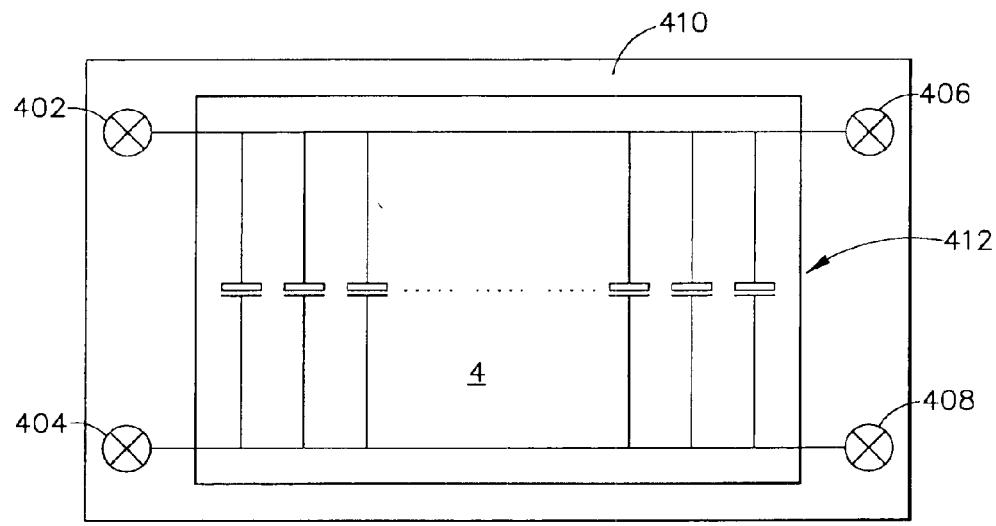
FIG. 7 illustrates an integrated/distributed DC-link capacitor board according to an embodiment of the invention.

FIG. 7 illustrates an integrated/distributed DC-link and snubber capacitor board according to an embodiment of the invention. Positive terminal 402 and negative terminal 404 connect to the power switching devices. Positive terminal 406 and negative terminal 408 connect to the external device or the DC-link terminals of another module. DC-link board 410 is laminated to minimize the DC bus inductance. Multiple low dissipation film capacitors at much smaller capacitance 412 are connected in parallel across the DC bus as required to obtain a larger integrated capacitor in a cost effective manner. This approach has the additional advantage of further reducing the internal equivalent inductance and distributing the thermal losses more evenly across many smaller capacitors with better cooling. Alternatively, several snubber capacitors can be used directly on the power interface board 84 and an external bulk capacitor used with the right capacitance to make-up the DC link. The first approach requiring a DC link board 86 in addition to the power interface board 84 is preferred because it provides a much smaller equivalent lead inductance at the price of a higher cost. The positive side of the DC bus connects positive terminals 402 and 406 and the negative side of the DC bus connects negative terminals 404 and 408. The capacitors 412 provide both energy storage for ride-through and filtering to the DC bus to reduce ripple due to the switching of the power switching devices.

Another aspect of an embodiment of the present invention provides for a much higher DC link voltage (350 VDC or 540 DC in a bipolar 270 VDC arrangement, i.e., ±270 VDC) due to the possibility of "voltage boost". Thus, the size of the DC link capacitor is reduced significantly. For the same power rating, a higher DC link voltage also demands a smaller current, which in turn reduces conduction power losses in the power conversion equipment. The combination of these two factors contributes to a reduced size, weight and cost of the overall system.

Figure 8:
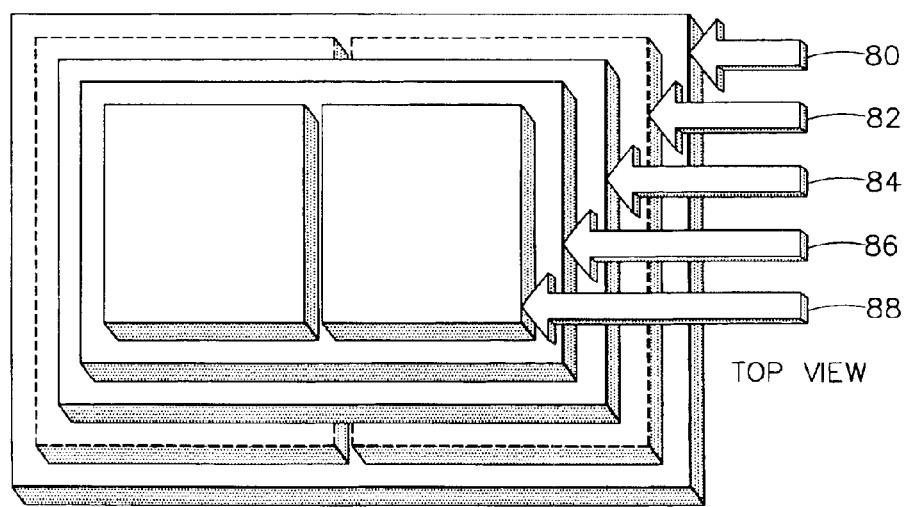
FIG. 8 illustrates a top view of the system hardware layers according to an embodiment of the invention.

FIG. 8 illustrates a top view of the system hardware layers. Layer 80 is heat sink. The power supply and power switching devices are located on layer 82. The interface board is located on layer 84. The distributed DC-link capacitor bank is location on layer 86 and the digital controller board is located on layer 88. The system hardware layers are configured to provide the optimum heat transfer to the heat sink and a small physical footprint and height profile thereby yielding a high power and volume density.

Aspects of the present invention are described in the following sections with respect to the power topology, modes of operation, control structure and control algorithm of conventional power conversion systems.

Power Topology

Figure 9A:
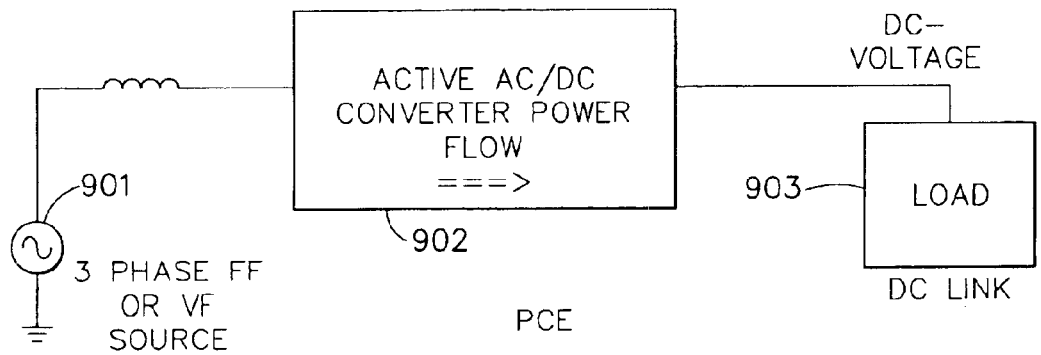
FIGS. 9A–9F illustrate AC-DC power conversion equipment (PCE) control structure and topology in Modes I, II and III according to an embodiment of the invention.
Figure 9B:
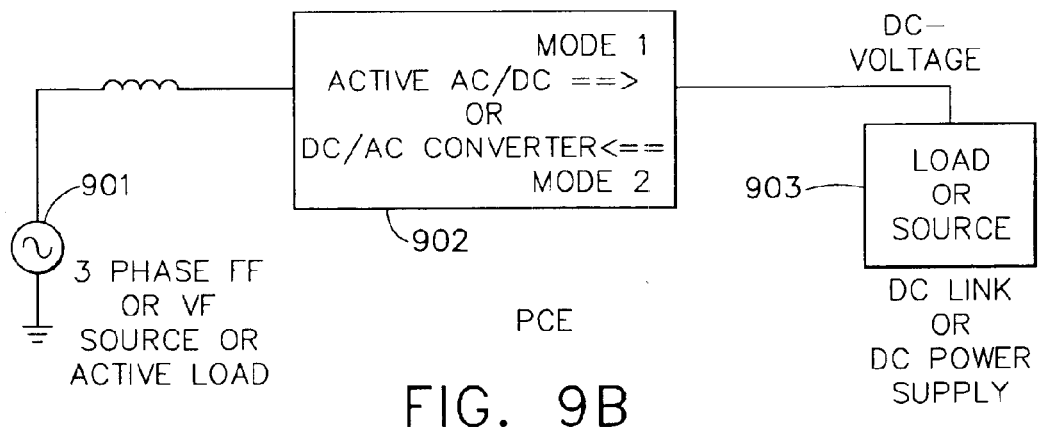

A simplified top-level system block diagram for a synchronous and bi-directional power conversion system for AC/DC or DC/AC power conversion from a Fixed Frequency (FF) or Variable Frequency supply is shown in FIG. 9A. A three phase "AC supply" 901 is connected to a Synchronous bi-directional AC/DC converter 902 and provides DC power to a load 903. The power flow is from left to right from the AC source 901 to DC load 903. The AC/DC converter 902 is a standard Voltage Source Inverter (VSI) with six active devices (such as IGBTs) and six reverse diodes integrated in one Intelligent Power Module (IPM). The IPM technology provides fault tolerant integrated voltage source inverters with internal gating isolation, gating power supply, short circuit protection, device power supply under-voltage protection and overvoltage protection. IPM technology significantly simplifies the implementation and protection of the power pass section of a voltage source inverter and is used as common building block for AC-DC or DC-AC power conversion. FIG. 9B illustrates the power flow in Mode I and Mode II.

Figure 9C:
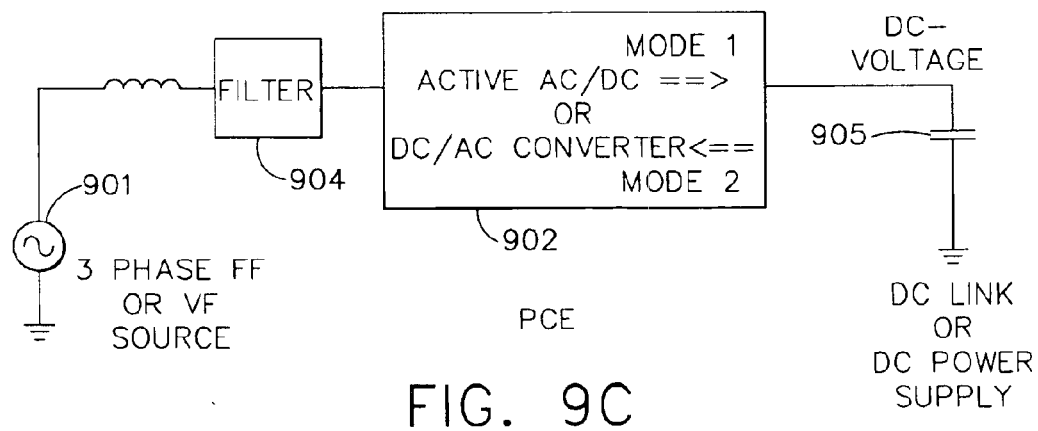

FIG. 9C provides a simplified block diagram showing the bi-directional capability of the synchronous AC-DC or DC-AC power conditioning equipment. The power flow can be from the left to right in an AC-DC converter whereas the same circuit could be used to achieve DC-AC power conversion where the power flow is then from right to left. "Load" 901 is connected to a Synchronous bi-directional AC-DC converter 902 through a three-phase filter 904. The converter 902, either supplies DC regulated DC power to a DC Bus through a DC link capacitor 905 or in reverse power flow mode, takes power from a DC power supply 905 and provides conditioned AC power to a load 901 through a three phase filter 904. If two such systems are cascaded to each other the power topology for AC-DC-AC power conversion equipment is obtained based on a common power electronic building block shown in FIGS. 9A and 9B.

In the following section, the modes of operation for this common power electronics building block and new Control Algorithm (CA) and the Digital-Phase-Locked-Loop (DPLL) are discussed in detail.

Modes of Operation

There are three modes of operation for the synchronous power conversion equipment shown in FIG. 1:

Mode I: Synchronous AC-DC Power Conversion Equipment (PCE);

Mode II: Synchronous DC-AC Power Conversion Equipment; and

Mode III: Synchronous AC-DC-AC Power Conversion Equipment.

Mode I. A Synchronous AC-DC Power Conversion Equipment:

In Mode I, as shown in FIG. 9C, the power conversion system converts a three-phase variable voltage, variable frequency input (VVVF) 901 into a regulated constant DC output 905 with unity input power factor (PF) and achieves minimal current total harmonic distortion (THD) at the same time. In this mode, the direction of power flow is from AC-side to DC-side (left to right).

Mode II. A Synchronous DC-AC Power Conversion Equipment

In Mode II, the power conversion system converts a DC Link input 905 into a three-phase Variable/Fixed Voltage and Variable/Fixed frequency output 901, as required with minimal current total harmonic distortion (THD). In this mode, the direction of power flow is from DC-side to AC-side (right to left).

Mode III. AC-DC-AC Power Conversion Equipment

The system utilizes Mode I and Mode II PCE connecting two presented systems together to a common internal DC Link and forms an AC-AC converter, as illustrated in FIG. 1, which in the general case converts a three-phase Variable/Fixed Voltage and/or Variable/Fixed frequency input into a three-phase Variable/Fixed Voltage and Variable/Fixed frequency output. In this mode, the power can be from left to right or from right to left.

The control structure will be described in the following section. The control structure describes how command and control signals are communicated to the respective power conversion equipment for each of the modes of operation (i.e., Mode I, Mode II and Mode III) discussed in the foregoing description.

Figure 9D:
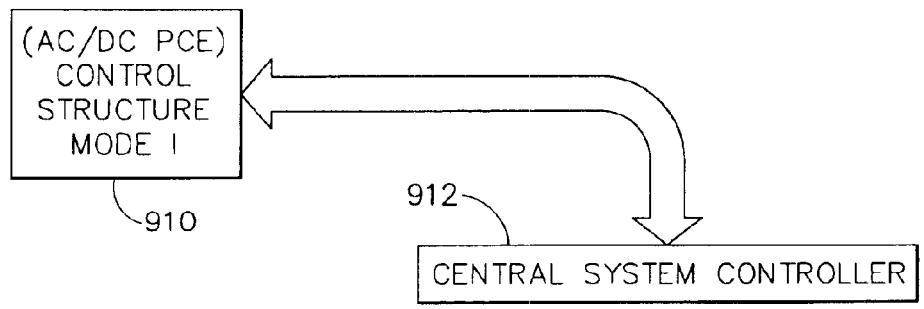
Figure 9E:
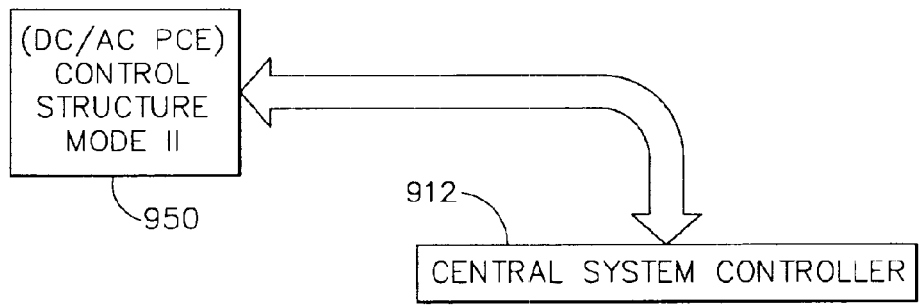
Figure 9F:
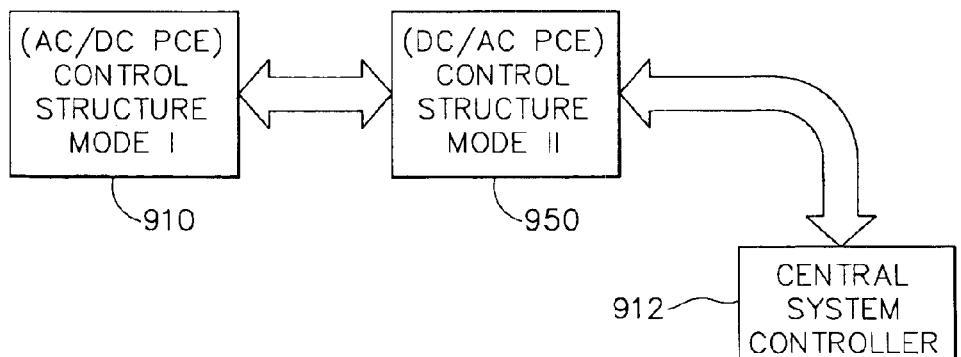

FIG. 9D illustrates a Mode I control structure. The AC/DC PCE system controller 910 is connected to a central system controller 912 that provides instructions for operation and receives status information back from the AC/DC PCE system controller 912. In Mode II, as shown in FIG. 9E, DC/AC PCE system controller 950 is connected to a central system controller 912 that provides instructions for operation and receives status information back from the DC/AC PCE controller 950. In FIG. 9F, Mode III operation is shown. Both an AC/DC PCE controller 910 and DC/AC PCE controller 950 are connected to a central system controller 912 that provides instructions for operation and receives status information back from PCE system controllers 910 and 950. During testing and debugging, the PCE for any of the three modes of operation can be connected to a stand-alone PC instead of a central controller applicable in the actual system.

Figure 10:
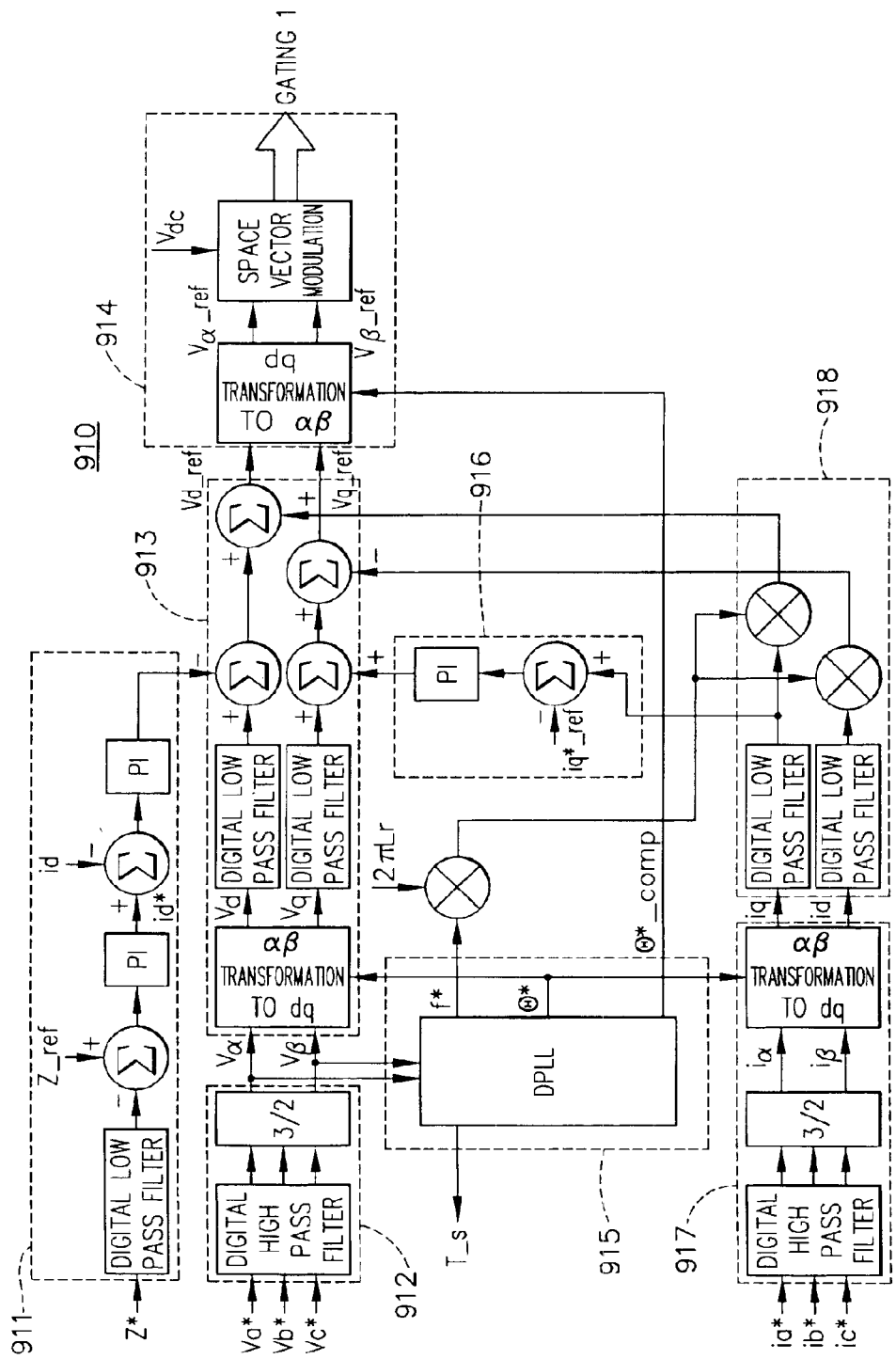
FIG. 10 illustrates a detailed control structure of an AC-DC controller according to an embodiment of the invention.

FIG. 10 illustrates a detailed common block diagram for the control strategy/algorithm which is applicable to both Mode I and Mode II PCE. The new aspects of the control strategy/algorithm include the following:

Common Control strategy for all modes of operation;

A new Digital Phase Lock Loop (DPLL) allowing synchronous wide frequency operation of the PCE for each mode of the operation;

Common control algorithm for either active rectification or inversion based on the actual dynamic PCE electrical system model, unlike traditional models which use only a simplified steady state model;

DC link voltage boost to much higher values than natural diode rectification of the AC system (e.g., ±270V DC, in 115V FF or VF power system);

Power factor correction on the source or load side;

The new optimum control structure/algorithm and digital phase lock loop operate at a much smaller switching frequency of 10 kHz (for aerospace wide variable frequency of 320–800 Hz) with consequently reduced thermal management requirements for filter components and IPMs;

Fast dynamic response, stable and oscillation free, unlike prior art which gives dead-beat oscillations for VF application) bi-directional and synchronous power conversion under all modes of operation;

The use of low-pass filters with fairly low cut-off frequencies of 100 Hz for active rectifier (AC-DC Mode I power conversion) direct and quadrature components (d-q components of 913 and 918) of the voltage and current are one of the other main aspects of the present common-block control strategy/algorithm. This further improves small/large signal dynamic performance of the system and improves the power quality performance without the need for large filters; and These allow the designer to set the crossover frequency of input/output filter at a much higher value as compared to traditional filters with the same configuration for similar applications.

Using the foregoing features, the present invention provides for common power conversion equipment for bi-directional and synchronous and wide variable frequency operation with minimum filtering requirements and reduced thermal management and consequently significantly reduces the cost, weight and size of the overall power conditioning equipment.

The control strategy blocks and associated internal control algorithms are implemented in a digital signal processor as shown and previously described in FIG. 6. During Mode I PCE (i.e., AC-DC active rectification), the control strategy/algorithm 910 according to an embodiment of the invention receives all the sensed analog signals: three phase input AC current (input of 917), three phase AC side voltages (input of 912), DC link voltage (Z*, input of 911) and uses the DSP (FIG. 6) to calculate the gating patterns for the individual devices of the IPM using a real time SV_PWM 914 implementation. The sampling frequency is internally adjusted in the DPLL block and a sampling period (T_s) is consequently generated which is updated and used for the internal digital signal processor and A/D converters.

Section 911 illustrates an active power control section that regulates the DC voltage. Section 912 transforms the three-phase voltage signals into two-phase voltages V$\alpha$ and V$\beta$. Section 913 takes V$\alpha$ and V$\beta$ and converts them into Vd and Vq and provides reference signals Vd_ref and Vq_ref to section 914. Section 914 is the PWM voltage regulation that provides the gating control signals using space vector modulation. Section 915 is the AC phase lock loop that receives V$\alpha$ and V$\beta$ and calculates the phase angle $\theta$ that is then passed to the digital PLL. The digital PLL implementation will be discussed in detail below. Section 916 is the power factor control block. Section 917 performs synchronization compensation. Section 918 performs the transformation of the three-phase current-signals into two-phase current signals I$\alpha$ and I$\beta$ and then to Id and Iq. Section 919 is the current decoupling block that filters the Iq and Id signals and provides the Iq signal to the power factor control block 916 and Iq and Id signals to section 913 for the feed-forward calculation.

FIG. 10 also applies for DC-AC power conversion and the same explanation for the control strategy/algorithm applies to Mode II PCE with the exception that instead of a regulation for DC bus voltage or another output variable such as speed or position, etc. (shown as Z* at the input of block 911) can be controlled in a closed loop fashion. For active loads such as synchronous electromechanical loads under Mode II operation, a speed or position (hall-effect or resolver) sensor is traditionally used for proper synchronization of the inverter (PCE) to the load. Usually, a synchronization signal is derived from other auxiliary circuits and is shown in FIG. 10 as a measured and conditioned signal input to block 912. The details of auxiliary circuits for achieving this type of sensor-based control methods are well known in the prior art and are not shown here.

Figure 11:
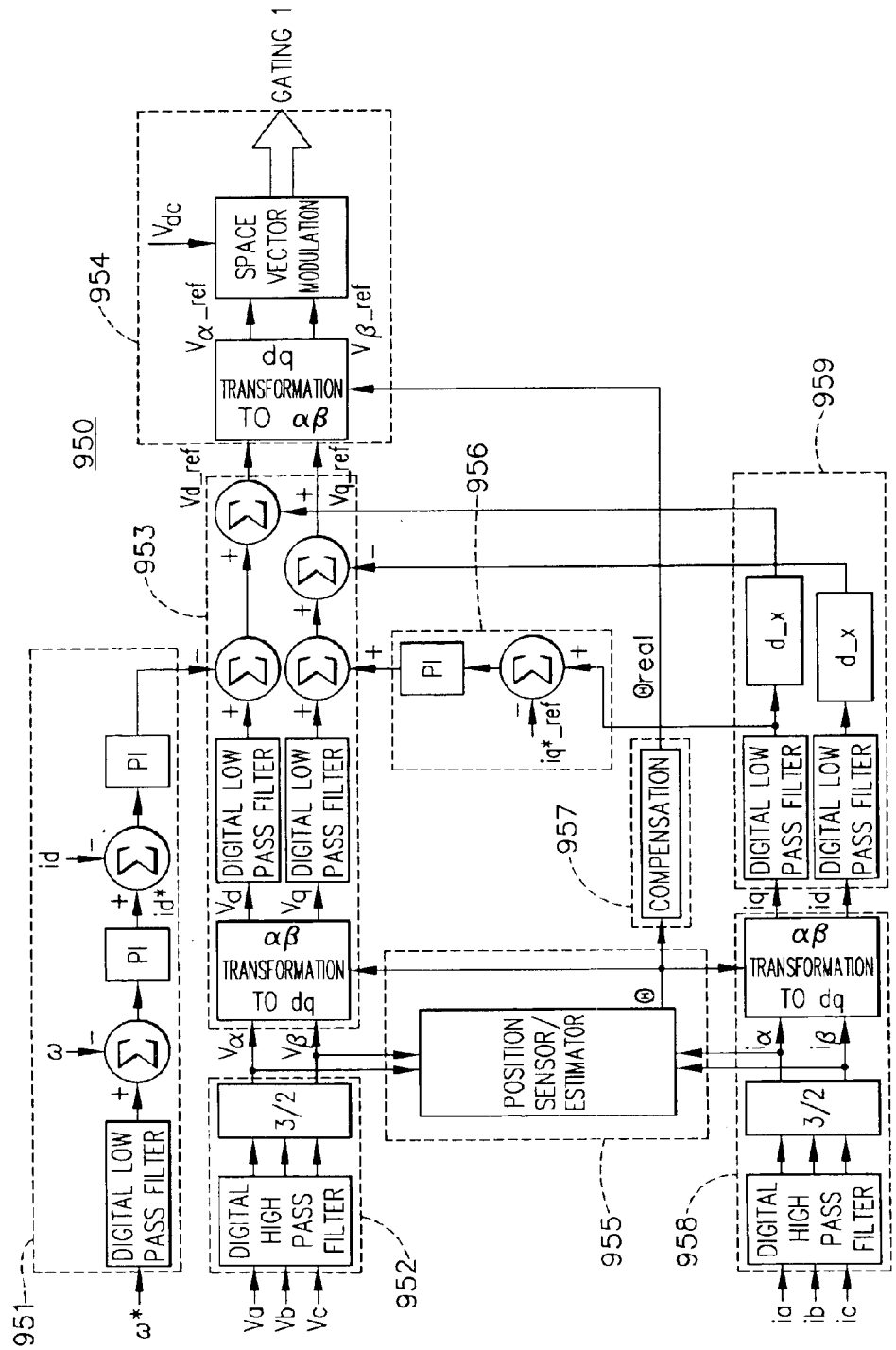
FIG. 11 illustrates a detailed control structure of an inverter controller according to an embodiment of the invention.

FIG. 11 illustrates the general controller structure 910 according to an embodiment of the invention wherein speed ($\omega$) is used as the input Z*. Section 951 performs active power control (e.g., speed/torque/current regulation). Section 952 transforms the three-phase voltage signals into two-phase voltages V$\alpha$ and V$\beta$. Section 953 takes V$\alpha$ and V$\beta$ and converts them into Vd and Vq and provides feed forward reference signals Vd_ref and Vq_ref to section 954. Section 954 is the PWM voltage regulation that provides the gating control signals using space vector modulation. Section 955 is a position sensor/estimator. If a sensor is used, phase angle $\theta$ is determined from feedback from an electromechanical device (e.g., resolver, encoder, and the like). Alternatively, a position estimator can be used that eliminates the need for the electromechanical sensor, but requires additional software. Sections 956–959 are similar in function to sections 916–919 described in relation to FIG. 10 and therefore will not be repeated.

In another preferred embodiment, FIG. 11 shows the possibility of a position/speed sensorless control method for an active electromechanical load by using the readily available terminal electrical information such as motor back-emf (input voltages to block 952) or line currents (alpha-beta currents to block 955).

Figure 12:
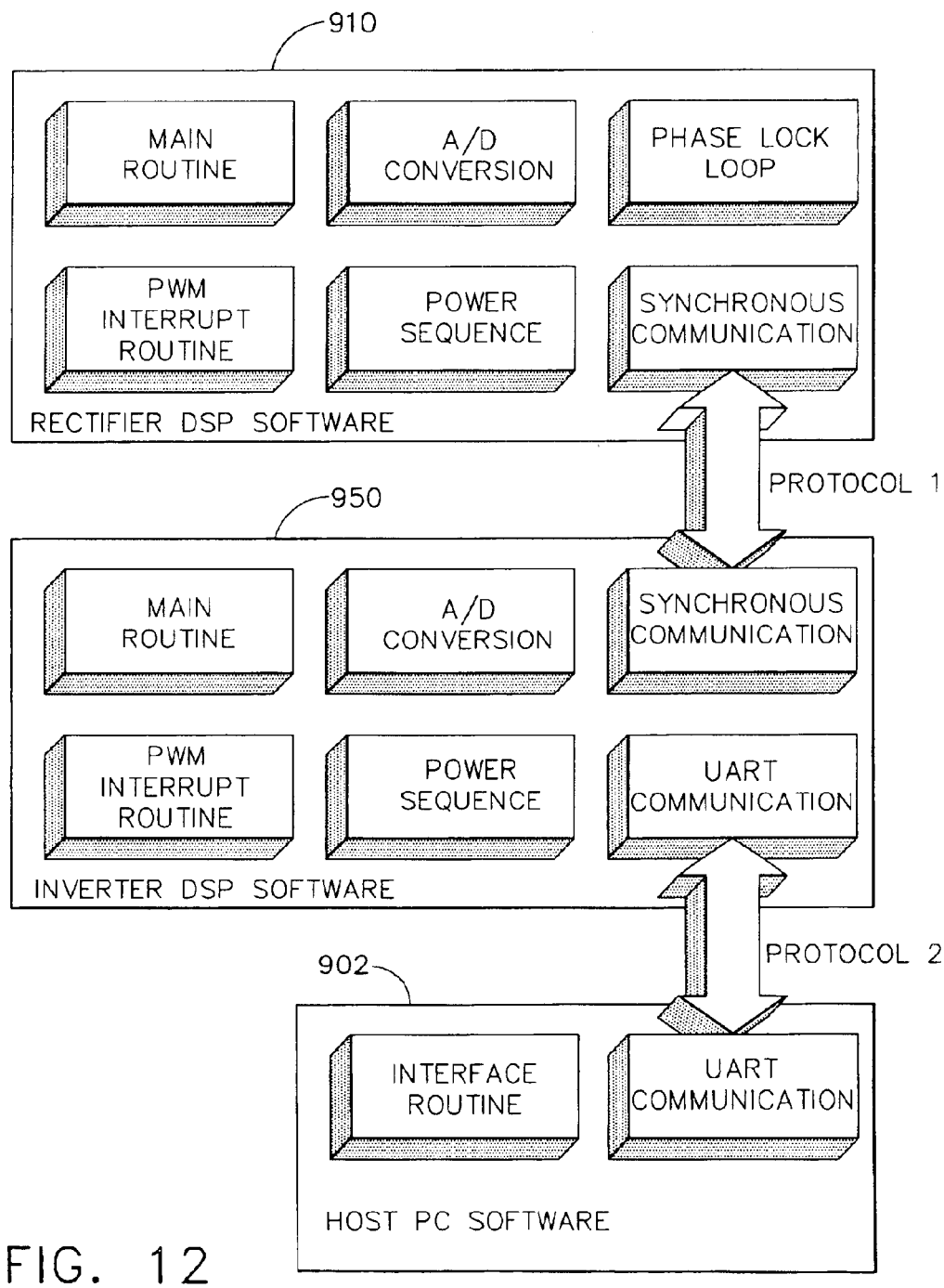
FIG. 12 is a block diagram of the system software and communications of an AC-DC-AC power system according to an embodiment of the invention.

FIG. 12 is a typical block diagram of the system software and communications of an AC-DC-AC power system according to an embodiment of the invention. The rectifier/input side software 910 and inverter/output side software 950 communicate via a synchronous communication protocol. The synchronous communication protocol allows for the real time coordination of the controllers. The inverter software also communicates with the system controller 902 via a second asynchronous protocol. The system controller 902 also communicates with the rectifier software 910 via the synchronous communication protocol. In addition to the control and switching functions, rectifier 902 and inverter 950 software systems also contain routines for digital power sequencing, diagnostics, monitoring and operation of the PCE.

The rectifier/input side software 910 structure includes a PLL module that is designed to work with the variable input frequency of the AC source. The PLL module will be discussed in detail below. A synchronous communication module is implemented on a serial port using serial port interrupts. The A/D conversion module includes the setup of the A/D converter, DC/AC voltage and AC current sensing, condition and calibration. The power sequence module controls the turn on/off procedure to ensure proper operation and also includes the fault detection and protection. The power sequence module will be discussed in detail below. The main routine is the normal loop of rectifier operation. The PWM interrupt routine is the main interrupt routine for the control algorithms and PWM generation. The interrupt cycle is related to the switching frequency.

The inverter/output side software structure 950 includes a synchronous communication module implemented on a serial port using serial port interrupts and UART (asynchronous) communication module on another serial port for communication to the host/system controller 902. The A/D conversion module includes the setup of the A/D converter, DC/AC voltage and current sensing, conditioning and calibration. The power sequence module controls the turn on/off procedure to ensure proper operation and also includes the fault detection and protection. The main routine is the normal loop of inverter operation. The PWM interrupt routine is the main interrupt routine for the control algorithms and PWM generation. The interrupt cycle is related to the switching frequency. The control strategy and algorithm are common but there are some differences as outlined in the foregoing sections. One of the main differences is the low pass filters and their cut-off frequencies and the fact that in an active rectifier the frequency of the source is being tracked by a digital PLL. In Mode II operation, the controller can control the frequency of the output voltage of the inverter to achieve synchronization with the back-emf of an active electromechanical load. However, other applications can use position control or simply a variable voltage variable frequency power supply and this can be achieved by independent control of the voltage and frequency of the inverter output voltage/currents. The foregoing description and details of FIG. 12 are merely for illustration and many alternative communications schemes can be implemented, as will be appreciated by those skilled in the art.

Figure 13A:
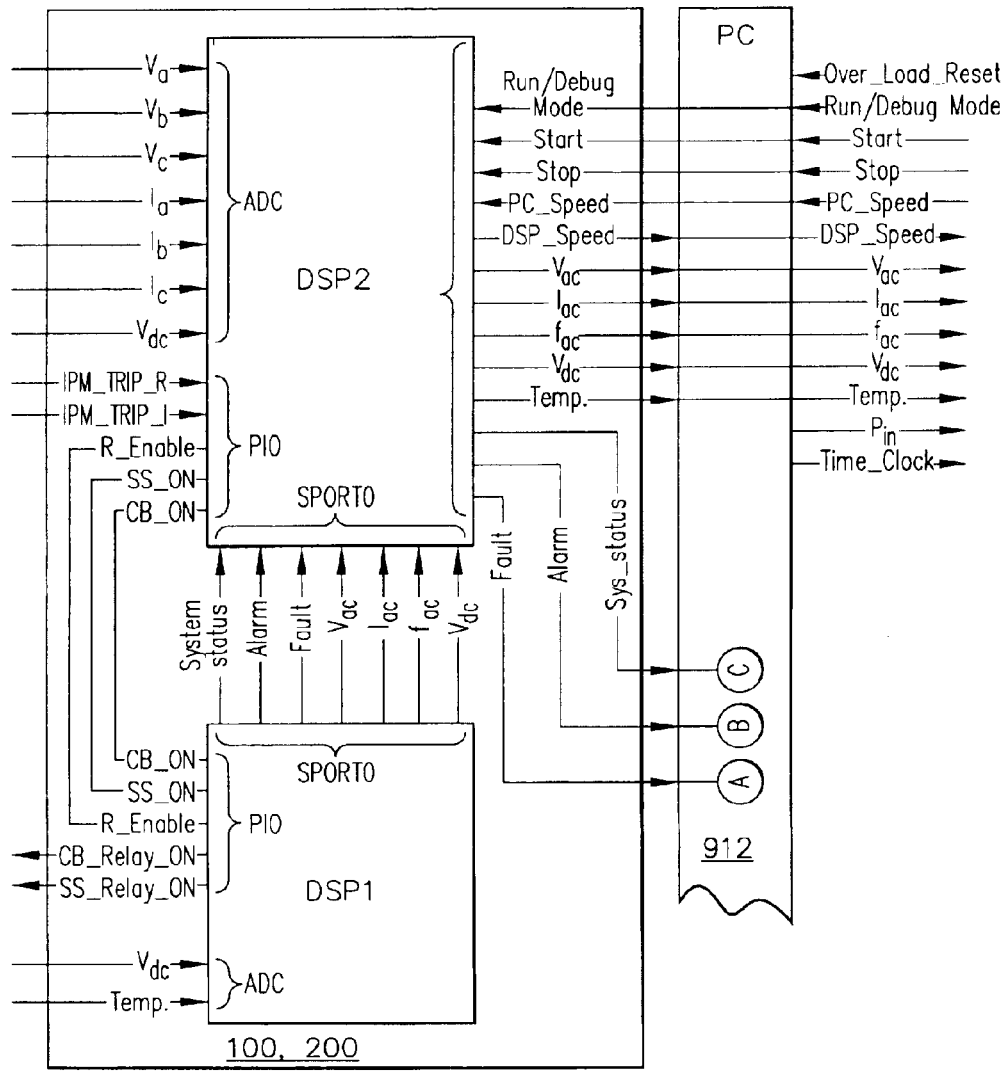
FIGS. 13A and 13B illustrate an interface of the power conversion equipment to a system controller according to an embodiment of the invention.
Figure 13B:
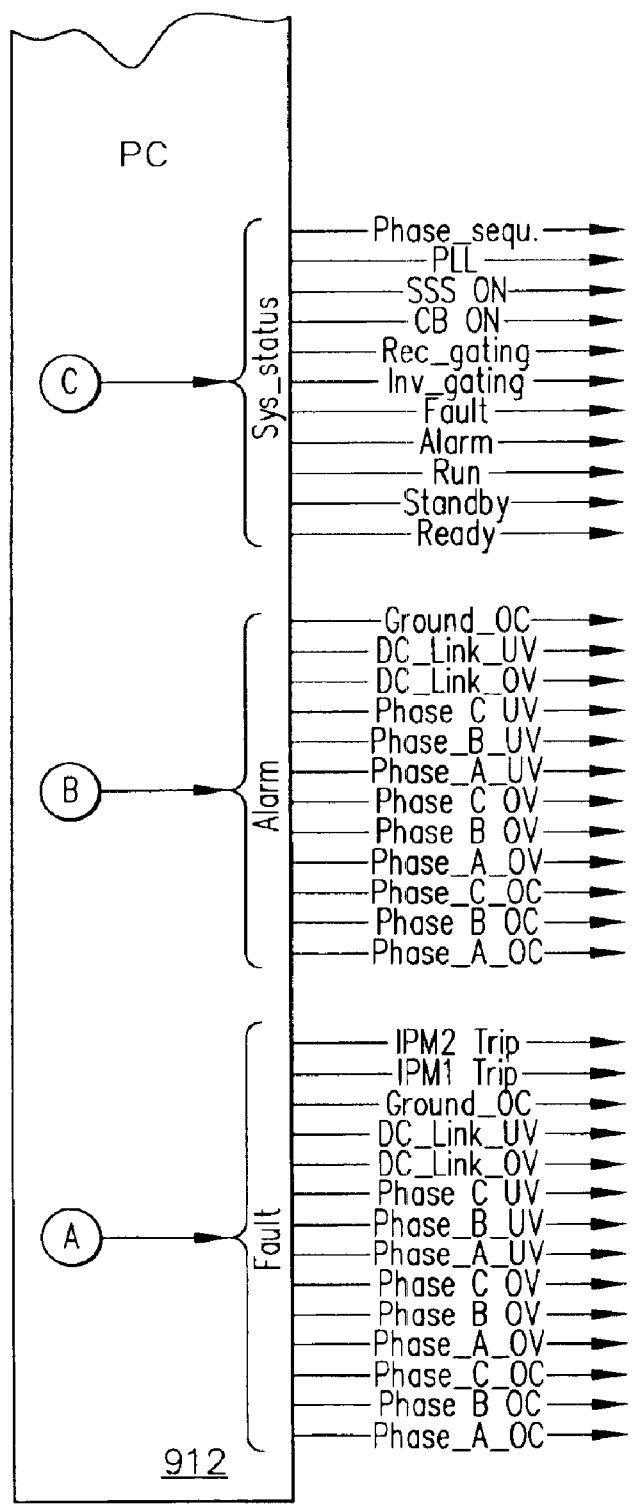

FIGS. 13A and 13B illustrate an interface of the PCE 100, 200 to a system controller 912. As illustrated, the AC voltage and current of the source/load and DC voltage and current of the DC-link are acquired by A/D converter and information derived from these signals is supplied to the system controller 902, such as AC voltage, current and frequency, DC voltage and the like. Additional control and status signals are communicated between the PCE 100, 200 and system controller 902. Control signals such as start, stop, and speed command ($PC_{13}$ Speed) can be communicated from a user via the system controller 912 to the PCE 100, 200 modules. System status, alarm and fault signals are also communicated within the PCE 100, 200 and to the system controller 902 as illustrated. Additional signals (e.g., temperature, and run/debug) can be communicated between the system controller 912 and the PCE. The foregoing description and details of FIGS. 13A and 13B are merely for illustration and many alternative configurations can be implemented, as will be appreciated by those skilled in the art.

Figure 14:
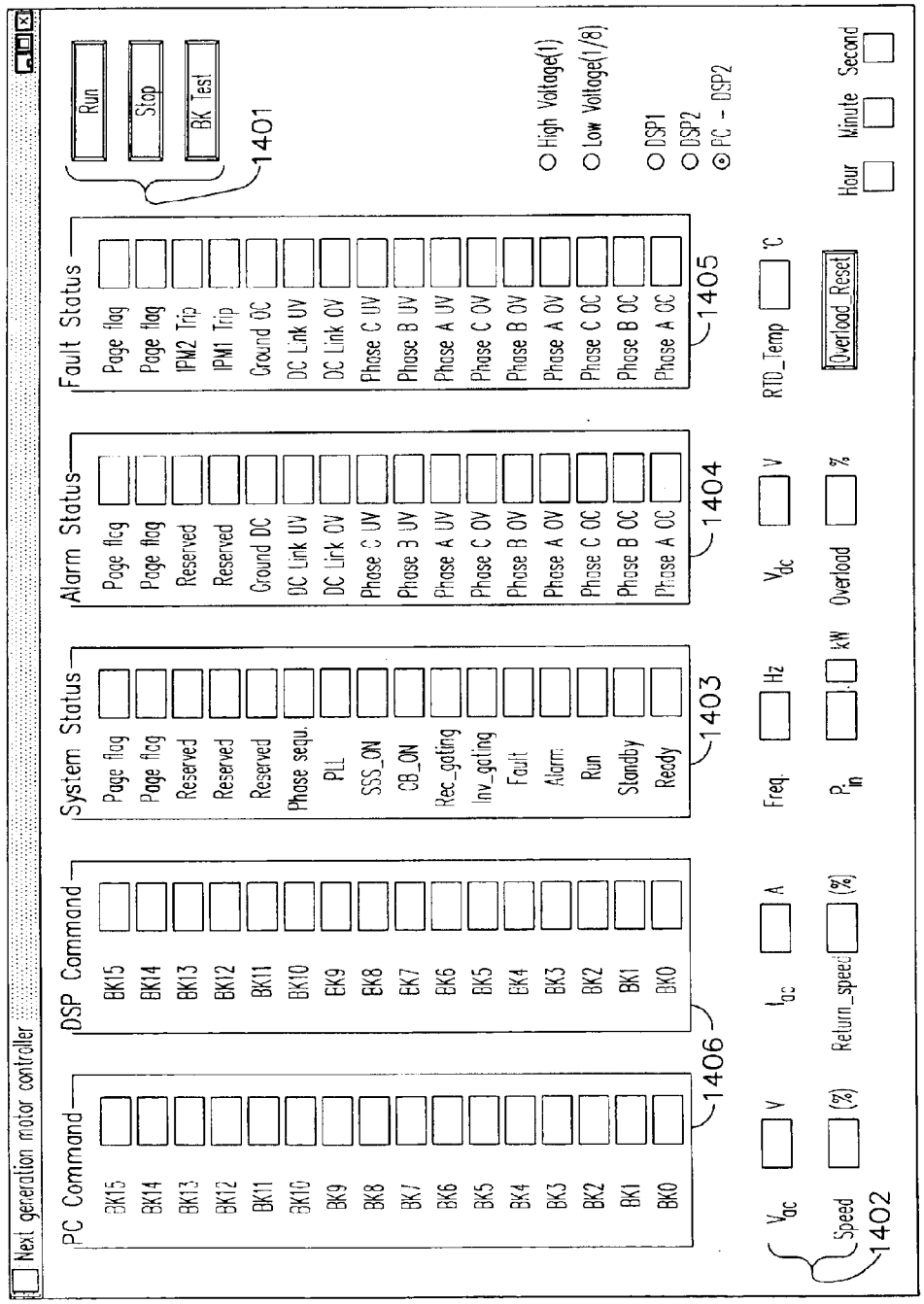
FIG. 14 illustrates an operator interface screen for controlling operation commands and monitoring proper operation of the system according to an embodiment of the invention.

FIG. 14 illustrates an example of an operator interface according to an embodiment of the invention. The control, status, fault and alarm information has been functionally grouped as illustrated. Group 1401 illustrates control buttons. Group 1402 illustrates system parameters. Group 1403 illustrates system status indicators. Group 1404 illustrates alarm status indicators. Group 1405 illustrates fault status indicators and group 1406 illustrates communication bit displays. Those skilled in the art will recognize that all the signals illustrated are not required nor is the invention limited to the signals illustrated. Signals can be added or removed as desired and as relevant to the PCE and the system the PCE is used in. Therefore, the signals and groupings are provided merely for illustration and not for limitation of the invention.

Figure 15:
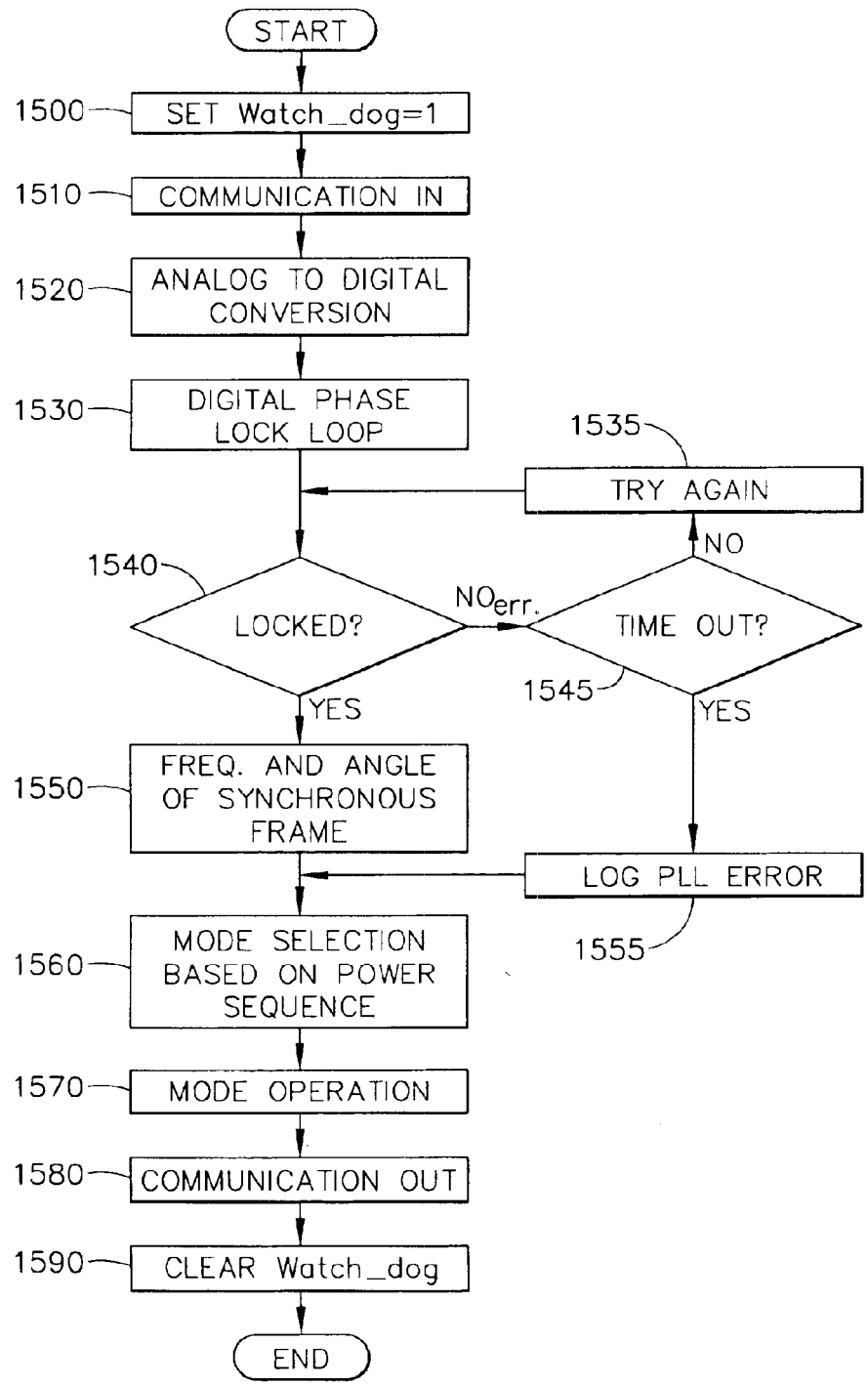
FIG. 15 illustrates a general control flow chart for a power conversion system according to an embodiment of the invention.

FIG. 15 illustrates a general control flow chart for the power sequencing and monitoring of the power conversion system according to an embodiment of the invention. This comprehensive power sequencing and monitoring system allows for communicating command/control signals from a System Controller/user 912 to the power conversion system and monitor and report back the status of the overall power system and its proper operation in real-time. This routine starts and sets the watchdog timer in step 1500. Communication from the system controller is received in step 1510. In step 1520, the A/D converter is activated and the values are read. In step 1530, the software for the digital phase lock loop (DPLL) is run and the lock status is checked in step 1540. If the system fails to lock then the process checks if the watchdog timer has timed out in step 1545. If the timer has not timed out, the system checks the status of the PLL again in step 1535. If the timer has timed out, then a PLL error is logged in step 1555. At step 1540, if a lock is established, then the frequency and angle of the synchronous frame is determined in step 1550. The mode selection is then determined based on the power sequence in step 1560. In step 1570, the mode selected is operated (e.g., power flow from AC to DC). In step 1580, the PCE communicates back to the system controller status, alarm, system parameters, and the like. Finally, in step 1590, the watchdog timer is cleared.

Figure 16:
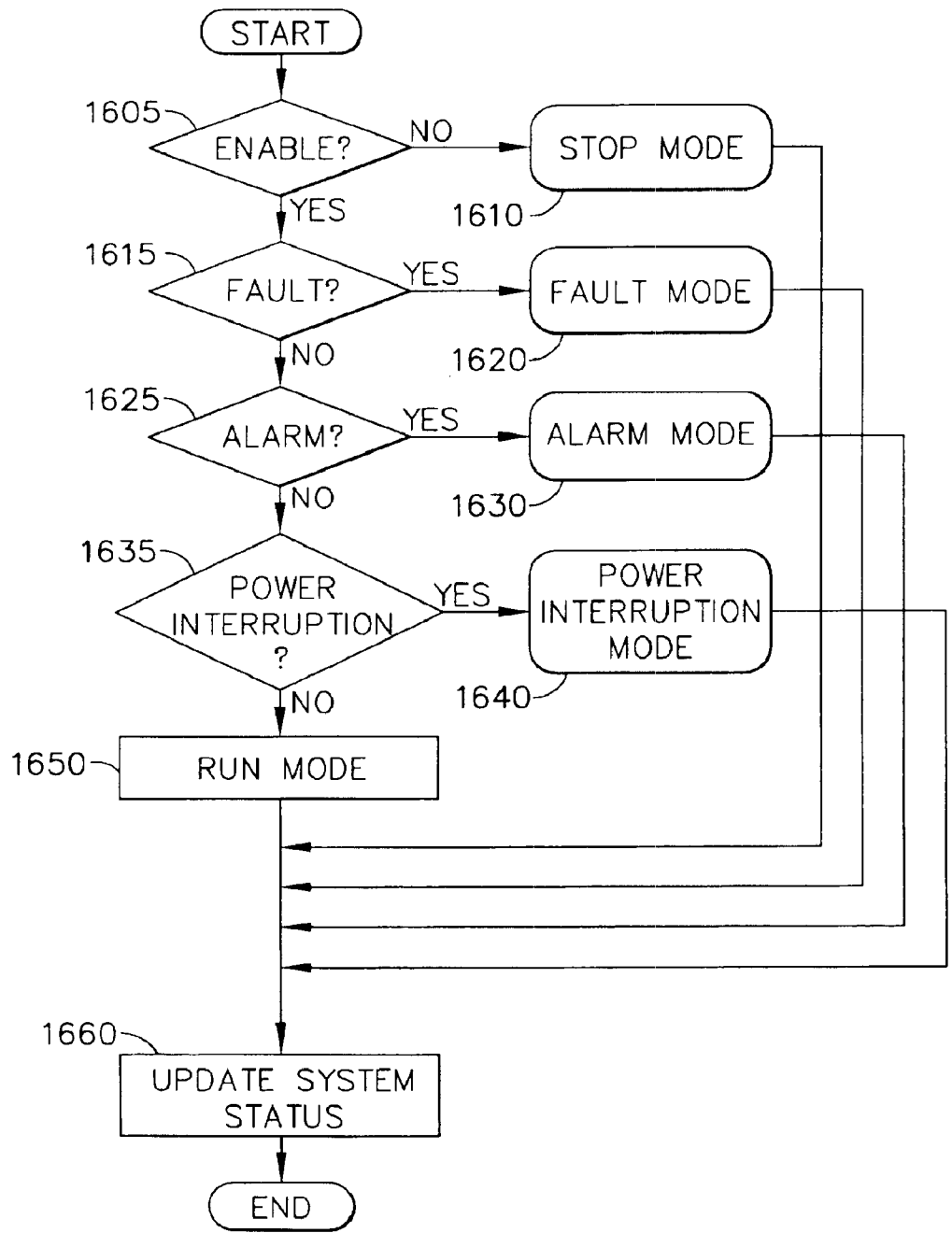
FIG. 16 illustrates a power sequence flow chart for power conversion equipment according to an embodiment of the invention.

FIG. 16 illustrates a power sequence flow chart for a power conversion system according to an embodiment of the invention. The control algorithm starts and checks the enable status of the system in step 1605. If the system is not enabled then the system enters/stays in the stop mode in step 1610. Assuming the system is enabled, the system checks to see if a fault has been flagged in step 1615. If a system fault is indicated, then the system enters a fault mode in step 1620. If a system fault is not indicated in step 1620, then the alarm status is checked in step 1625. If an alarm is indicated, the system enters an alarm mode in step 1630. If an alarm is not indicated, then the power interruption state is checked in step 1635. If the power is interrupted (e.g., circuit breaker open) then the system enters a power interruption mode in step 1640. If the power interruption state is negative, then the system enters a run mode in step 1650. Regardless of what state was encountered (e.g., stop, fault, alarm, power interruption, and run) the system status is updated in step 1660. Those skilled in the art will appreciate the invention is not limited to the sequence of the steps in the generalized flow chart illustrated in FIG. 16 and is not limited to the particular steps shown. For example, several alarm and fault levels could be included. Therefore, the flow charts of FIG. 16 and related FIGS. 17–19 are presented only for illustration and not limitation.

Figure 17:
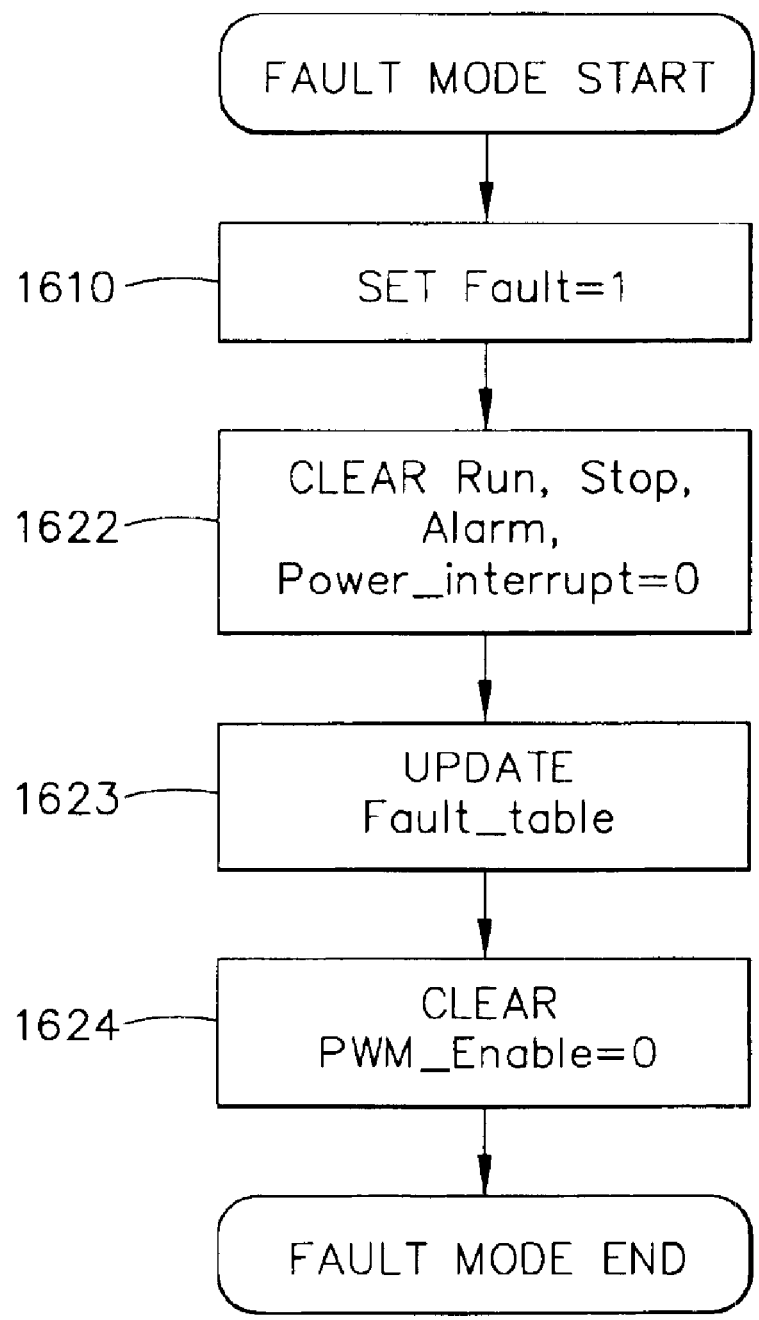
FIG. 17 is a general flow chart for the fault mode according to an embodiment of the invention.

FIG. 17 is a general flow chart for the fault mode. In step 1621, the fault mode is set. In step 1622, the other mode indicators are cleared. In step 1623, fault table information is updated archiving the fault that has been indicated. The drive enable is cleared in step 1624 and the process returns and updates the system status as shown in FIG. 16.

Figure 18:
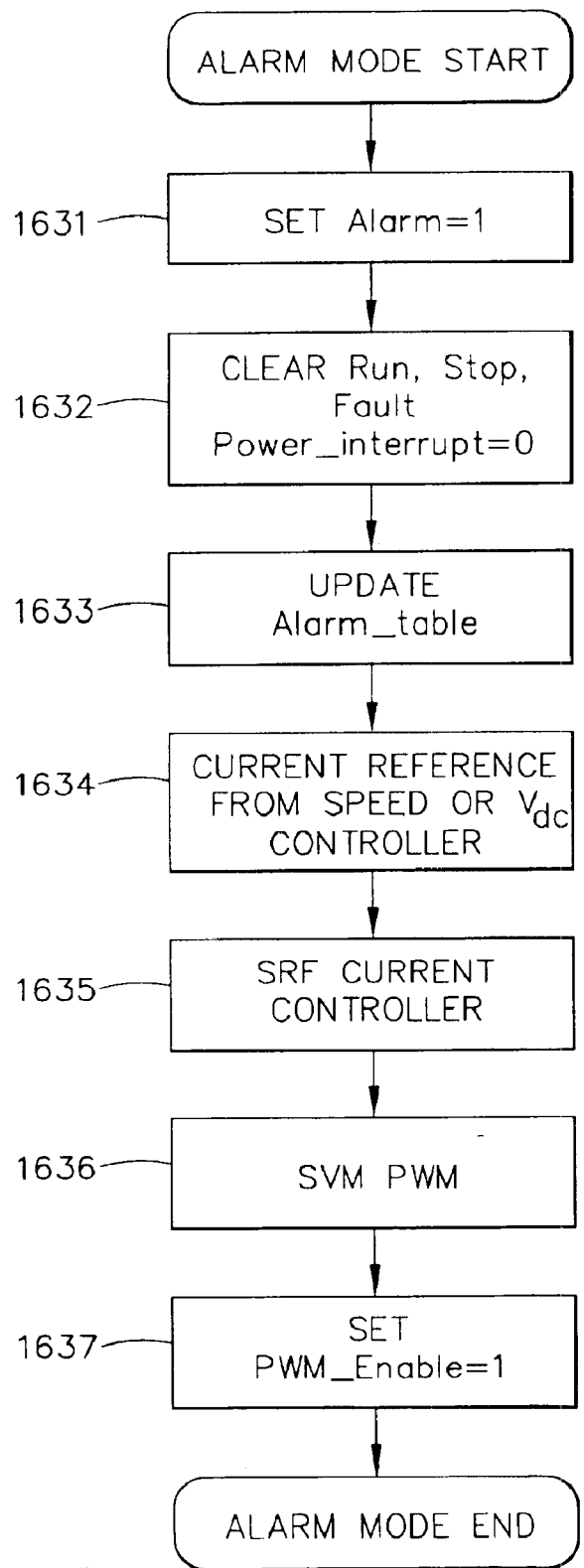
FIG. 18 is a general flow chart for the alarm mode according to an embodiment of the invention.
Figure 19:
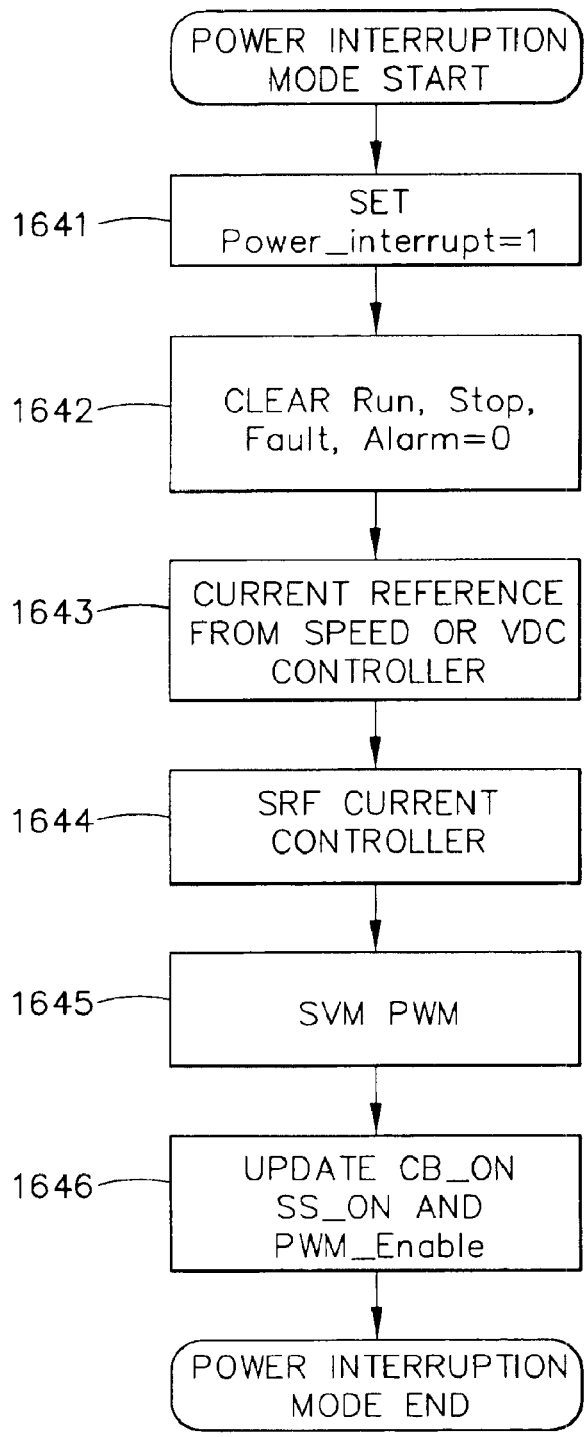
FIG. 19 is a general flow chart for the power interruption mode according to an embodiment of the invention.

FIG. 18 is a general flow chart for the alarm mode. In step 1631, the alarm mode is set. In step 1632, the other mode indicators are cleared. In step 1633, alarm table information is updated archiving the alarm that has been indicated. Since the system can operate in the alarm mode, the necessary control operations to operate the drive are activated in steps 1634 to 1636. The drive is enabled in step 1637 and the process returns and updates the system status as shown in FIG. 16. FIG. 19 is a general flow chart for the power interruption mode. In step 1641, the power interruption mode is set. In step 1642, the other mode indicators are cleared. Since the system can operate in the power interruption mode, the necessary control operations to operate the drive are activated in steps 1643 to 1645. The circuit breaker, Soft Starter and PWM drive are enabled in step 1646 and the process returns and updates the system status as shown in FIG. 16.

Figure 20:
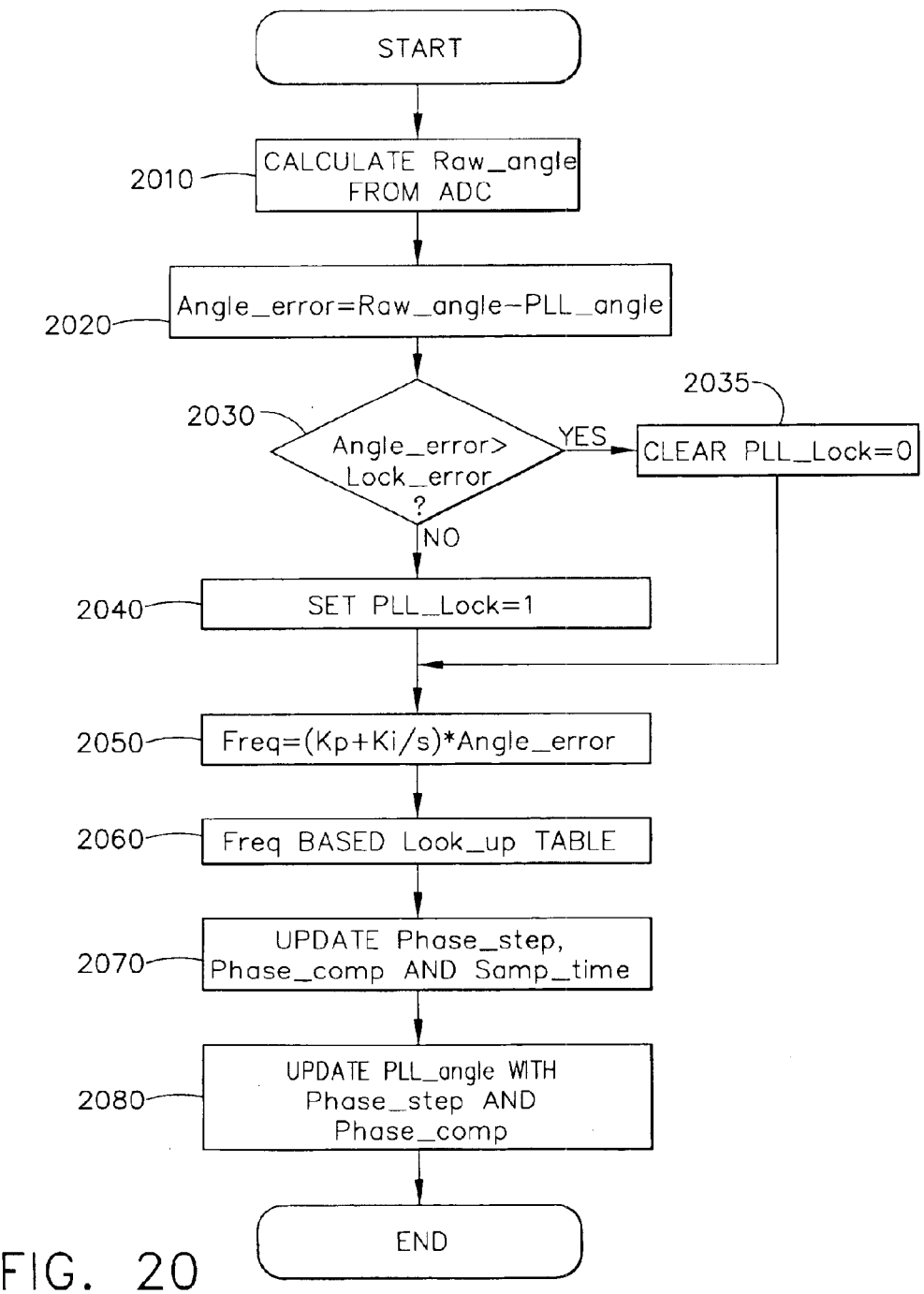
FIG. 20 is a flow chart for a digital PLL according to an embodiment of the invention.

FIG. 20 is a flow chart for a digital PLL according to an embodiment of the invention. In step 2010 the raw angle $\theta$ is calculated. An angle error is calculated in step 2020. The angle error is compared to an acceptable lock error. If the angle error is greater then the PLL_lock indicator is cleared, otherwise the PLL_lock indicator is set, in steps 2035 and 2040, respectively. Once the PLL lock has been established the frequency is calculated in step 2050 and a frequency based lookup table is accessed in step 2060. Using the values retrieved from the lookup table, phase step, phase compensation and sampling time are determined in step 2070. In step 2080, the PLL angle is updated using the phase step and phase compensation values. A more detailed description of the digital PLL follows.

In power electronics based systems, the clock signal for the sampling frequency for the A/D conversion system has to be adjusted as the frequency of the AC-side is changing. In variable frequency system with wide frequency variations (2:1 or more as in aerospace VF systems), this poses a challenge for the implementation of the loop filter and stable operation of the DPLL.

One aspect of the present invention is presented for estimating and adjusting real time sampling frequency and consequently the sampling time interval as the system fundamental frequency changes. Furthermore, the switching frequency of the power conditioning equipment is maintained constant. Additionally, the total number of samples in one system fundamental period is always maintained as an even number for proper stable operation and to prevent dead-beat oscillations.

Figure 21A:
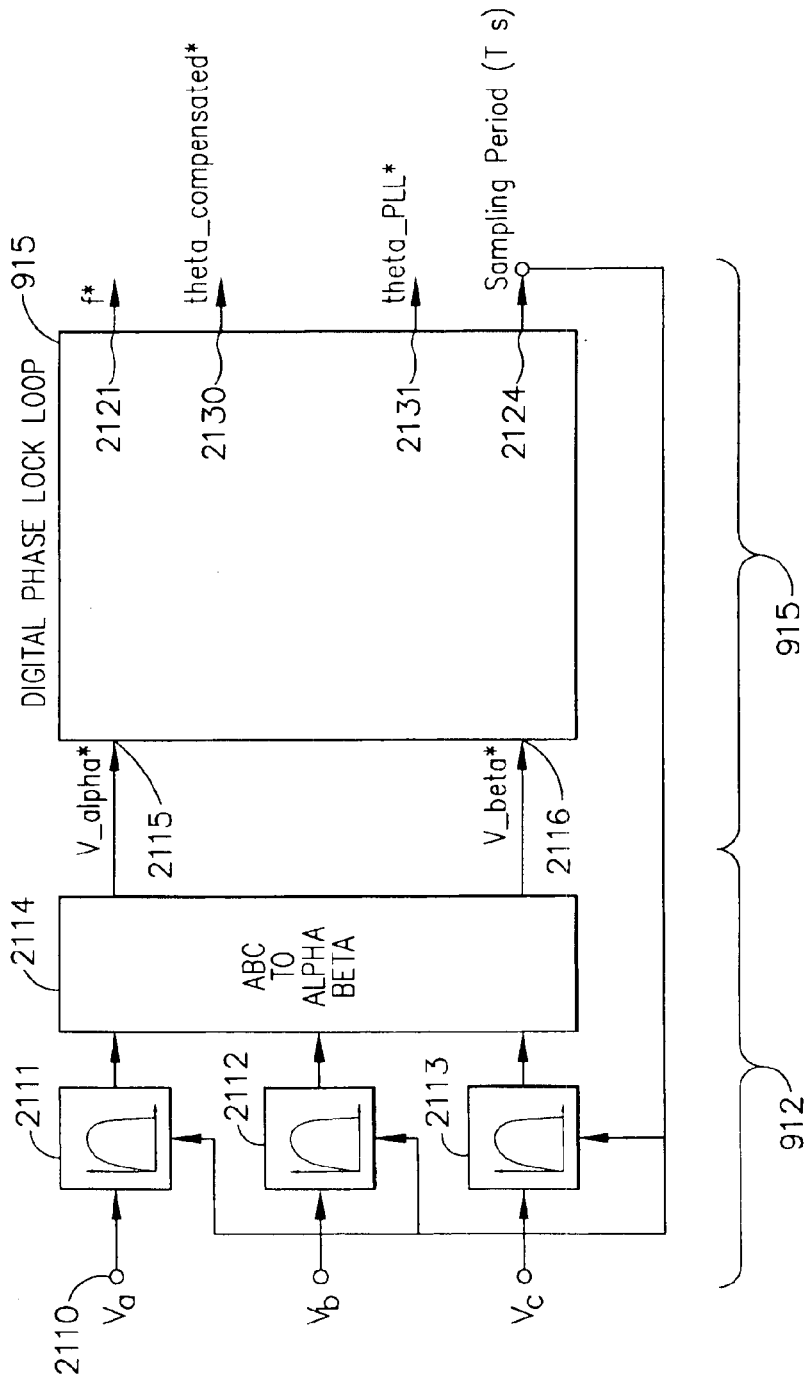
FIG. 21A illustrates a simplified top-level block-diagram representation of the DPLL showing all the inputs and outputs according to an embodiment of the present invention.
Figure 21B:
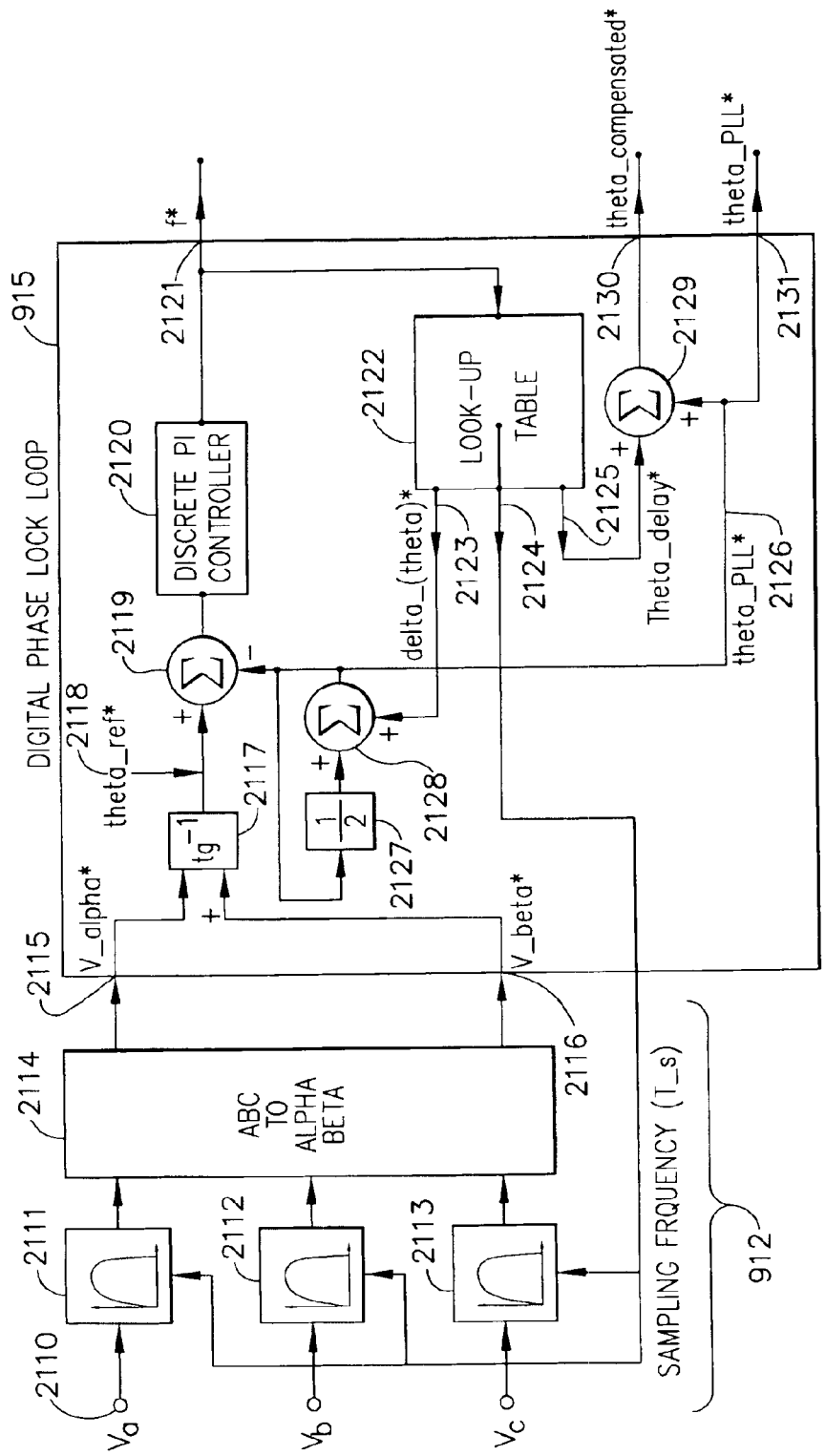
FIG. 21B illustrates a simplified block-diagram representation showing the details of how the DPLL is implemented according to an embodiment of the invention.

The real time implementation of this nonlinear DPLL method is not trivial. FIG. 21A shows a simplified top-level block-diagram representation of the DPLL 915 (as illustrated in FIG. 10) showing the inputs and outputs. The inputs to the DPLL are alpha/beta components of the AC side system voltage from block 912 in FIG. 10. These are obtained by measuring the AC side voltages (2110, 2111, 2112) and converting them to digital words through a D/A converter. Referring to FIG. 21B, one aspect of this invention provides a simplification of the many complex calculations for the nonlinear DPLL 915 by developing a three-dimensional look-up table 2122. The look-up table 2122 is pre-calculated and is implemented in a feed-forward predictive fashion. The input to the look-up table 2122 is measured frequency 2121 and the output is pre-calculated estimates for the sampling frequency/period 2124, a real-time measure of phase angle delay 2125 for correction of the digital implementation, and an incremental phase angle step measurement 2123 for the implementation of digital integration. The method for determining these outputs of look-up table 2122 are well known in the art and therefore will not be further detailed herein.

A simplified block-diagram representation of the DPLL is shown in FIG. 21B. The DPLL provides connection of a Fixed Frequency or Variable Frequency supply/load to active power conversion equipment in a synchronous fashion. The * symbol represents sampled data values after a sample and zero-order-hold, as referred to in a sampled data system. First, the three phase-neutral voltages (Va, Vb, and Vc) 2110 are measured and these three analog signals are converted to digital signals through a sample and hold, and an A/D converter (respectively, 2111, 2112 and 2113). Then, through a standard abc-to-alpha/beta transformation 2114, a synchronous rotating reference frame is established. From $V_{13}$ alpha (Vα) 2115 and V_beta (Vβ) 2116, the reference angle is calculated by taking the inverse tangent 2117. The block 2117 and summer block 2119 form an input section that determines the phase angle error signal (theta_error), which is then fed to a discrete PI controller 2120 to provide f* 2121, which is a real-time sampled data value of the variable frequency (fundamental component). This variable frequency 2121 is fed to a three-dimensional look-up table 2122. For each f* input, three values, phase angle step shown as delta (theta) 2123, and sampling frequency 2124, and theta_delay 2125, are obtained. This look-up table 2122 is pre-calculated for certain frequencies in the desired range with desired resolution (e.g., 1 Hz to 40 Hz intervals depending the system requirements and memory used for the look-up table) to simplify real-time calculations. This significantly simplifies the implementation of the nonlinear DPLL. Blocks 2127 and 2128 form a discrete integrator that performs a discrete integration of the estimated phase angle. The sample and hold control signals are generated by sampling frequency 2124, which is adjusted in real time to meet two design criterion:

1. Low switching frequency around 10 kHz; and
2. Even number of the sampling intervals N (i.e., T_s divided by 1/f should be even).

For example, when the fundamental frequency of the VF system varies between 320 to 780 Hz, the value of N changes between 32 to 14, respectively. Finally, an accurate angle calculation is obtained by incorporating the phase angle delay (theta_delay*) 2125 to the estimated phase angle (theta_PLL*) 2135 to account for a time delay which is inherent to the digital implementation (in this case 1.5× T_s).

The DPLL accurately provides a real-time measure of the angle which is used for the implementation of the control algorithm and is used for the transformation of time varying components (alpha and beta components in a rotating reference frame) to time-invariant components (d-q components in a stationary reference frame) and vice versa.

The structure of the digital PLL is illustrated in FIGS. 21A and 21B. As discussed above, the outputs of the look-up table 2122 include sampling frequency, phase angle delay, and phase angle step. Sampling frequency/time is the cycle time of the current controller that uses the digital phase lock. It is updated at every control step based on the pre-calculated values in the look-up table 2122 based on the frequency.

Phase angle delay is the delay time between real angle and delayed angle in one control cycle. It can also be interpreted as the delay time between voltage angle and current angle for a current controller used in a current-controlled voltage source inverter. Angle delay is caused by the digital implementation and includes factors such as digital sampling, low pass filtering in signal conditioning and the like. It is updated at every control step based on the pre-calculated values in the look-up table 2122 based on the frequency.

Phase angle step is the integration step between the previous estimated PLL angle ($\theta_{PLL}(n-1)$) and the present estimated PLL angle ($\theta_{PLL}(n)$). It can also be interpreted as the frequency multiple sampling time from the original concept of integration. Phase angle step is updated at every control step based on the pre-calculated values in the look-up table 2122 based on the frequency.

The following tables describe the function for the various modules for the digital PLL. Each table includes the inputs and calculation used to establish the outputs of each module. An angle reference calculator 2118 is defined as follows.

| Items | Content |
| --- | --- |
| Input | Vα(n) Vβ(n) |
| Processing | Theta_ref(n) = Atan (Vα(n)/Vβ(n)) |
| Output | Theta_ref(n) |

Vα(n) and Vβ(n) are generated from the AC voltage input as described in the foregoing discussion. The PLL PI controller 2120 is defined as follows.

| Items | Content |
| --- | --- |
| Input | Theta_error |
| Processing | f(n) = (theta_error)$K_{PLL}(1 + 1/ST_{PLL})$ |
| Output | f(n) |

$K_{PLL}$ represents the proportional gain constant and $ST_{PLL}$ represents the multiplication of the laplace-transform complex-frequency variable, S, and the integrator time constant $T_{PLL}$ in the PLL PI controller 2120. The discrete integrator formed by blocks 2127 and 2128 is defined as follows.

| Items | Content |
| --- | --- |
| Input | Phase_angle_step(n), ΘPLL(n), |
| Processing | ΘPLL(n) = ΘPLL(n − 1) + Phase_angle_step(n) |
| Output | ΘPLL(n) |

Look-up table 2122 is defined as follows.

| Items | Content |
|---|---|
| Input | f(n) |
| Processing | Calculating Sampling_frequency(n), Phase_angle_step(n) and Phase_angle_delay(n) |
| Output | Sampling_frequency(n), Phase_angle_step(n) and Phase_angle_delay(n) |

Phase angle compensation 2130 is determined as follows.

| Items | Content |
|---|---|
| Input | θPLL(n), Phase_angle_delay(n) |
| Processing | θcompensation(n) = θPLL(n) − Phase_delay(n), |
| Output | θcompensation(n) |

The DPLL developed for variable frequency power conditioning equipment described above as one aspect of the present invention is different from prior art in the following ways:

A feed-forward predictive method based on a look-up table is used to track the system variable frequency;

The input to the look-up table is measured system frequency and there are three outputs:
 1. Sampling frequency and interval;
 2. Real-time measure of phase delay for correction of the digital implementation;
 3. Delta angle measure;

Constant switching frequency is maintained for the power conditioning equipment;

Proper stable operation is achieved over the wide-frequency range of 2:1 by preventing dead-beat oscillations because the total number of samples in one system fundamental period is continuously monitored and maintained as an even number;

Correction of the implementation phase delay is incorporated and the corresponding error is compensated at every sample point;

Closed loop control of the DPLL is achieved with good dynamic response through predictive integration of the incremental phase delay angles with minimal time delay;

Complex numerical calculations are avoided by pre-calculation of the values and storing them is a three dimensional look-up table for ease of implementation; and Excellent and stable dynamic performance of this DPLL over the full variable frequency range alleviates prior art stability problems which otherwise would have required large filter components in the power pass section of the power electronics system.

From the foregoing description of the invention, those skilled in the art will appreciate that the present invention improves upon the prior art in many aspects. A summary of some of these improvements follows.

The synchronous bi-directional active power conditioning system is designed as a common power electronics building block (power-pass), which can be used for AC-DC, DC-AC individually or cascaded together for AC-DC-AC power conversion. The system provides the following:

Power conversion equipment for active rectification (Mode I operation) for variable frequency systems;

Power conversion equipment for active loads such as adjustable speed drives which require variable voltage variable frequency power management systems (Mode II operation) from a DC power supply; and Power conversion equipment for active loads such as adjustable speed drives which require variable voltage variable frequency power management systems (Mode II operation).

A method and apparatus for digital phase lock loop for aerospace and other industry wide variable frequency systems are provided with the following distinct features:

A Digital Phase Lock Loop (DPLL) allowing synchronous wide frequency operation of the PCE for each mode of the operation;

A feed-forward predictive method based on a look-up table is used to track the system variable frequency;

Substantially constant switching frequency is maintained for the power conditioning equipment;

Proper stable operation is achieved over the wide-frequency range of 2:1 or more by preventing dead-beat oscillations. The total number of samples in one system fundamental period is continuously monitored and maintained as an even number;

Correction of the implementation phase delay is incorporated and the corresponding error is compensated at every sample point;

Closed loop control of the DPLL is achieved with good dynamic response through predictive integration of the incremental phase delay angles with minimal time delay;

Complex numerical calculations are avoided by pre-calculation of the values and storing them is a three dimensional look-up table for ease of implementation; and Excellent and stable dynamic performance of the DPLL over the full variable frequency range alleviates prior art stability problems which otherwise would have required large filter components in the power pass section of the power electronics system.

The common control algorithm for either active rectification or inversion is based on the actual dynamic PCE electrical system model, unlike traditional models, which use only a simplified steady state model. The control algorithm provides:

DC link voltage boost to much higher values than natural diode rectification of the AC system (e.g., ±270V DC, in 115V FF or VF power system);

Power factor correction on the source or load side, as required;

The new optimum control structure/algorithm and digital phase lock loop, operate at a much lower switching frequency of 10 kHz. (for aerospace wide frequency of 320 to 800 Hz) with consequently reduced thermal management requirements for filter components and IPMs;

Fast dynamic response, stable and oscillation free, (unlike prior art which gives dead-beat oscillations for VF application) bi-directional and synchronous power conversion under all modes of operation;

The use of low-pass filters for active rectifiers (Mode I operation) with fairly low cut-off frequencies of 100 Hz for direct and quadrature components of the voltage and current further improves small/large signal dynamic performance of the system and improve the power quality/EMI performance without the need for large filters; and The cross-over frequency of input/output filter can be set at a much higher value as compared to the traditional filters of the same configuration for similar applications and this further reduces the size and cost of filtering components.

As a result of common control algorithm (software) and common power-pass power electronics building blocks (hardware), efficient, reconfigurable, flexible and scalable fault tolerant power electronics systems can be realized with lower or higher power ratings. The synchronous and bi-directional capability allows seamless parallel-series operation of these common modules (hardware and software) to easily achieve scale-up or down of the power ratings.

According to other aspects of the present invention, improvements and refinements to the prior art power conversion equipment for motor controls are presented for integration of complex hardware functions/components into one circuit card assembly that further improve reliability and facilitate ease of integration and reduce the cost and weight of the overall power conditioning systems for next generation aerospace and other industry applications. These include the following:

All the sensing for three phase AC current and AC voltage;

All the sensing for DC link current and voltage;

Signal conditioning and isolation circuitry for all the sensed signals;

Signal isolation for All the gate driver circuitry for providing on/off control to the intelligent power modules (IPMs), and routing all the protective/status signals for monitoring the health of IPM;

DC-link voltage much higher than natural diode rectification of the AC system and distributed DC Link snubber capacitors right close to the DC link terminals of the IPM module;

Integrated and distributed control/logic power supply;

Integrated Soft start circuitry and associated controls;

All logic/control interconnect; and

All Power pass bus-bars and interconnections as applicable.

The foregoing merely illustrates the principles of the invention. It will be appreciated that those skilled in the art will be able to devise various arrangements, which, although not explicitly described or shown herein, embody the scope of the present invention. For example, the arrangement of and designation of the hardware and software modules were provided for illustration and the modules could be combined into one integrated platform or subdivided in various combinations different from those illustrated yet still providing the same functional operation. Accordingly, the power conversion system described above is not limited to the illustrated arrangement or configuration of hardware and software modules. Therefore, the scope of the invention is not limited by the foregoing description but is defined solely by the appended claims.

What is claimed is:

1. A synchronous and bi-directional power conversion module for use in a variable frequency power conversion system, the power conversion module comprising:

a digital controller that receives signals from AC and DC voltage and current sensors and generates gating signals to power switching devices to control power flow between an AC side and a DC side of the power switching devices, wherein the digital controller includes a digital phase lock loop (DPLL) that uses a feed-forward predictive system based on a look-up table to track the system variable frequency, which is a frequency of a variable frequency power source.

2. The synchronous and bi-directional power conversion module according to claim 1, wherein the power conversion module is configurable to operate as a rectifier (AC-DC) or an inverter (DC-AC).

3. The synchronous and bi-directional power conversion module according to claim 2, wherein the power conversion module is configured as a rectifier and is combined with another power conversion module configured as an inverter to provide AC-DC-AC power conversion.

4. The synchronous and bi-directional power conversion module according to claim 1, wherein the system frequency varies over a ratio of 2 to 1 or more.

5. The synchronous and bi-directional power conversion module according to claim 1, wherein a total number of samples in one system fundamental period is continuously monitored and maintained as an even number.

6. The synchronous and bi-directional power conversion module according to claim 5, wherein when the system variable frequency varies between 320 to 800 Hz, the total number of samples is adjusted accordingly to achieve a constant switching frequency for the power switching devices.

7. The synchronous and bi-directional power conversion module according to claim 1, wherein a substantially constant switching frequency is maintained for the power switching devices.

8. The synchronous and bi-directional power conversion module according to claim 7, wherein the power conversion module operates at a switching frequency of approximately 10 kHz for a system frequency range of 320 to 800 Hz.

9. The synchronous and bi-directional power conversion module according to claim 8, further comprising:

low-pass filters for active rectifiers having cut-off frequencies on the order of 100 Hz for direct and quadrature components of system voltage and current.

10. The synchronous and bi-directional power conversion module according to claim 1, further comprising:

a control power supply that internally generates voltages needed for the power conversion module from a single control power source;

a DC-link connected to the DC side of the power switching devices;

a filter including inductive and capacitive elements connected to the AC side of the power switching devices; and signal conditioning and isolation circuitry for all sensed signals including the sensors for detecting AC voltages and currents on the AC side and DC voltage and current on the DC-link, wherein the digital controller, signal conditioning and isolation circuitry, sensors, filter, DC-link, power switching devices and control power supply are integrated into a common circuit card assembly.

11. A digital phase lock loop (DPLL) for variable frequency power conversion systems comprising:

an input section that determines a reference phase angle error signal based on a reference phase angle of a variable frequency input and an estimated phase angle;

a PI controller that determines a measured frequency of the variable frequency input based on the phase angle error signal; and a look-up table that, using the measured frequency, determines a phase angle step, a sampling frequency, and a phase angle delay, wherein the estimated phase angle is generated by a discrete integrator using the phase angle step and a prior value of the estimated phase angle, and a compensated phase angle is generated using the estimated phase angle and the phase angle delay.

12. The digital phase lock loop according to claim 11, wherein the phase angle step, the sampling frequency, and the phase angle delay are determined at every sample point and wherein the compensated phase angle is generated at every sample point.

13. The digital phase lock loop according to claim 11, wherein the variable frequency input varies over a ratio of 2 to 1 or more.

14. The digital phase lock loop according to claim 11, wherein the look-up table is a three-dimensional look-up table.

15. The digital phase lock loop according to claim 14, wherein stored values in the look-up table relating to the measured frequency and the phase angle step, the sampling frequency, and the phase angle delay are pre-calculated.

16. The digital phase lock loop according to claim 15, wherein the stored values in the look-up table are calculated for discrete intervals of the measured frequency, and wherein the intervals ranges from 1 Hz to 40 Hz.

17. The digital phase lock loop according to claim 15, wherein the stored values in the look-up table are calculated for each 20 Hz interval of the measured frequency.

18. The digital phase lock loop according to claim 11, wherein the variable frequency input ranges from 320 to 800 Hz.

19. The digital phase lock loop according to claim 11, wherein a total number of samples in one system fundamental period is continuously monitored and maintained as an even number.

20. The digital phase lock loop according to claim 19, wherein when the variable frequency input varies between 320 to 800 Hz, the total number of samples is adjusted accordingly to achieve a constant switching frequency for the power switching devices.

21. A method for implementing a digital phase lock loop (DPLL) for variable frequency power conversion systems, the method comprising:

determining a reference phase angle error signal based on a reference phase angle of a variable frequency input and an estimated phase angle;

determining a measured frequency of the variable frequency input based on the phase angle error signal; and using the measured frequency as an input to a look-up table that generates a phase angle step, a sampling frequency, and a phase angle delay, wherein the estimated phase angle is generated by a discrete integrator using the phase angle step and a prior value of the estimated phase angle, and a compensated phase angle is generated using the estimated phase angle and the phase angle delay.

22. The method according to claim 21, wherein the phase angle step, the sampling frequency, and the phase angle delay are determined at every sample point and wherein the compensated phase angle is generated at every sample point.

23. The method according to claim 21, wherein the variable frequency input varies over a ratio of 2 to 1 or more.

24. The method according to claim 21, wherein the look-up table is a three-dimensional look-up table.

25. The method according to claim 24, further comprising:

pre-calculating stored values in the look-up table relating the measured frequency and the phase angle step, the sampling frequency, and the phase angle delay.

26. The method according to claim 25, wherein the stored values in the look-up table are calculated for discrete intervals of the measured frequency, and wherein the intervals are from 1 Hz to 40 Hz.

27. The method according to claim 25, wherein the stored values in the look-up table are calculated for each 20 Hz interval of the measured frequency.

28. The method according to claim 21, wherein the variable frequency input ranges from 320 to 800 Hz.

29. The method according to claim 21, wherein a total number of samples in one system fundamental period is continuously monitored and maintained as an even number.

30. The method according to claim 29, wherein when the variable frequency input varies between 320 to 800 Hz, the total number of samples is adjusted accordingly to achieve a constant switching frequency for the power switching devices.

* * * * *